(12) United States Patent
Furuse et al.

(10) Patent No.: US 7,884,584 B2
(45) Date of Patent: Feb. 8, 2011

(54) SWITCHING POWER SUPPLY CIRCUIT

(75) Inventors: Katsuhisa Furuse, Hyogo (JP); Yasuhiro Ishizaka, Osaka (JP); Shohtaroh Sohma, Osaka (JP); Koichi Hagino, Hyogo (JP); Shinichiro Yamada, Osaka (JP); Toshiya Murota, Hyogo (JP); Masanobu Fukushima, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 42 days.

(21) Appl. No.: 12/487,073

(22) Filed: Jun. 18, 2009

(65) Prior Publication Data

US 2010/0013447 A1    Jan. 21, 2010

(30) Foreign Application Priority Data

Jul. 17, 2008    (JP)    .............. 2008-185954

(51) Int. Cl.
*G05F 1/00*    (2006.01)
(52) U.S. Cl. ................ 323/222; 323/901; 323/283
(58) Field of Classification Search .............. 323/222, 323/283, 901, 284
See application file for complete search history.

(56) References Cited

U.S. PATENT DOCUMENTS 6,737,845 B2 *    5/2004   Hwang ............... 323/284

FOREIGN PATENT DOCUMENTS

| JP | 3651460 | 3/2005 |
|---|---|---|
| JP | 3739760 | 11/2005 |
| JP | 2006-148971 | 6/2006 |
| JP | 4026422 | 10/2007 |
| JP | 2008-236816 | 10/2008 |

* cited by examiner

*Primary Examiner*—Shawn Riley
(74) *Attorney, Agent, or Firm*—Cooper & Dunham LLP

(57) ABSTRACT

A switching power supply circuit for generating an output voltage at an output node based on an input voltage at an input node includes a reference voltage generating circuit configured to generate a reference voltage such that during an initial start-up period of the reference voltage a voltage rise rate of the reference voltage within a first predetermined period from a start point of the initial start-up period and a voltage rise rate thereof within a second predetermined period immediately preceding an end point of the initial start-up period are smaller than a voltage rise rate thereof in a period between the first predetermined period and the second predetermined period, a coil disposed between the input output nodes, and a switch circuit configured to switch on and off to control current through the coil in response to comparison between the reference voltage and a voltage proportional to the output voltage.

10 Claims, 33 Drawing Sheets

FIG.9
(a)
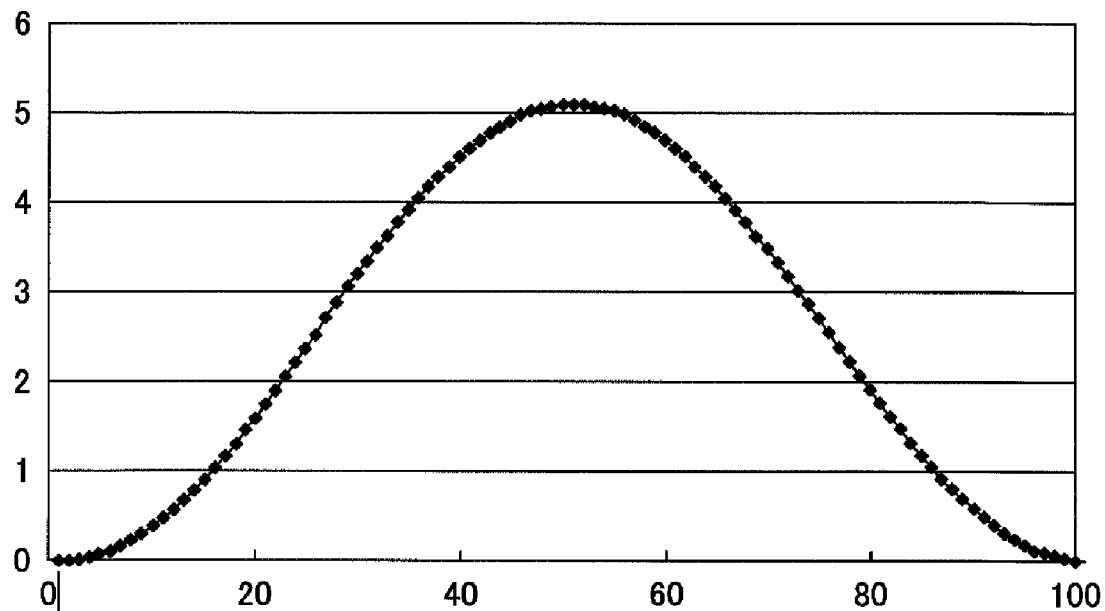
(b)
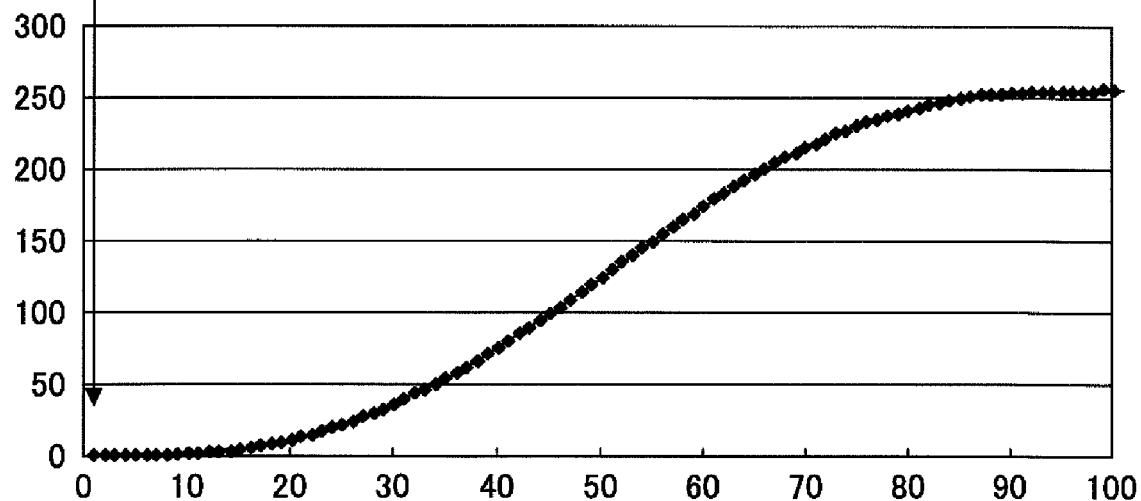

FIG.10

| ADDRESS | CODE |
|---|---|
| 0 | 0 |
| 1 | 0 |
| 2 | 0 |
| 3 | 0 |
| 4 | 0 |
| 5 | 0 |
| 6 | 0 |
| 7 | 0 |
| 8 | 0 |
| 9 | 1 |
| 10 | 1 |
| 11 | 2 |
| 12 | 3 |
| 13 | 3 |
| 14 | 4 |
| 15 | 5 |
| 16 | 7 |
| 17 | 8 |
| 18 | 9 |
| 19 | 11 |
| 20 | 13 |
| 21 | 15 |
| 22 | 17 |
| 23 | 19 |
| 24 | 21 |
| 25 | 24 |
| 26 | 27 |
| 27 | 29 |
| 28 | 32 |
| 29 | 36 |
| 30 | 39 |
| 31 | 43 |
| 32 | 46 |
| 33 | 50 |
| 34 | 54 |
| 35 | 58 |
| 36 | 62 |
| 37 | 66 |
| 38 | 71 |
| 39 | 75 |
| 40 | 80 |
| 41 | 85 |
| 42 | 89 |
| 43 | 94 |
| 44 | 99 |
| 45 | 104 |
| 46 | 109 |
| 47 | 114 |
| 48 | 119 |
| 49 | 124 |
| 50 | 130 |

| ADDRESS | CODE |
|---|---|
| 51 | 135 |
| 52 | 140 |
| 53 | 145 |
| 54 | 150 |
| 55 | 155 |
| 56 | 160 |
| 57 | 165 |
| 58 | 169 |
| 59 | 174 |
| 60 | 179 |
| 61 | 183 |
| 62 | 188 |
| 63 | 192 |
| 64 | 196 |
| 65 | 200 |
| 66 | 204 |
| 67 | 208 |
| 68 | 211 |
| 69 | 215 |
| 70 | 218 |
| 71 | 221 |
| 72 | 225 |
| 73 | 227 |
| 74 | 230 |
| 75 | 233 |
| 76 | 235 |
| 77 | 237 |
| 78 | 239 |
| 79 | 241 |
| 80 | 243 |
| 81 | 245 |
| 82 | 246 |
| 83 | 247 |
| 84 | 249 |
| 85 | 250 |
| 86 | 251 |
| 87 | 251 |
| 88 | 252 |
| 89 | 253 |
| 90 | 253 |
| 91 | 254 |
| 92 | 254 |
| 93 | 254 |
| 94 | 254 |
| 95 | 254 |
| 96 | 254 |
| 97 | 254 |
| 98 | 255 |
| 99 | 255 |
| 100 | 255 |

FIG. 20
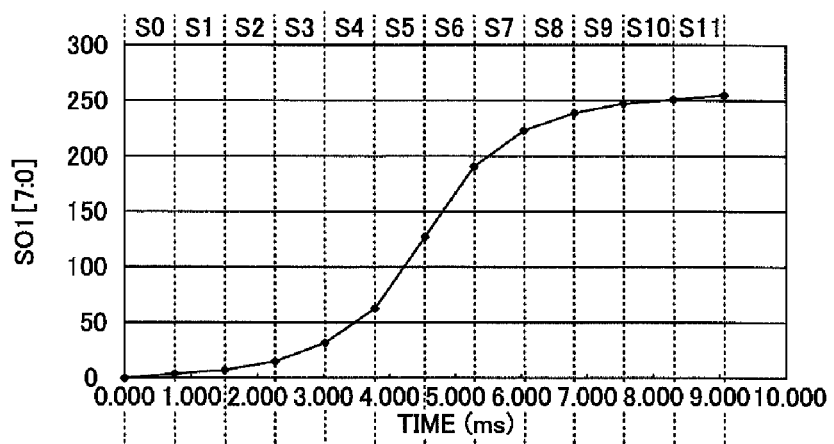
(a)
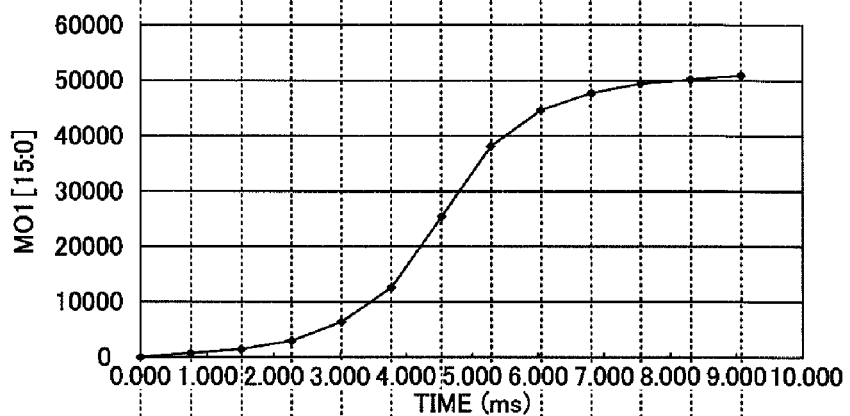
(b)
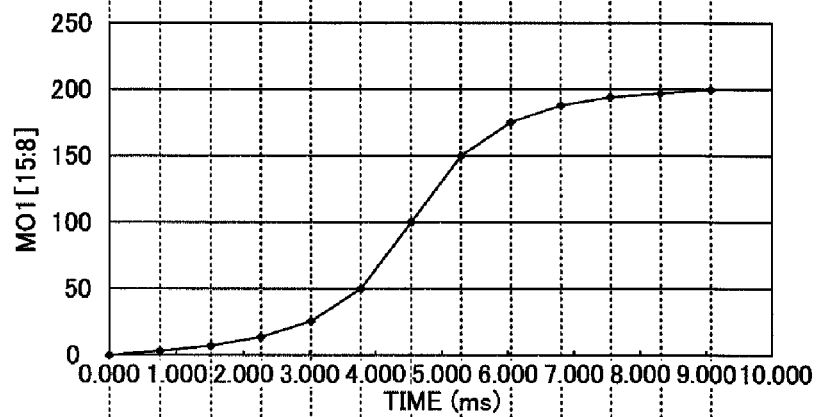
(c)
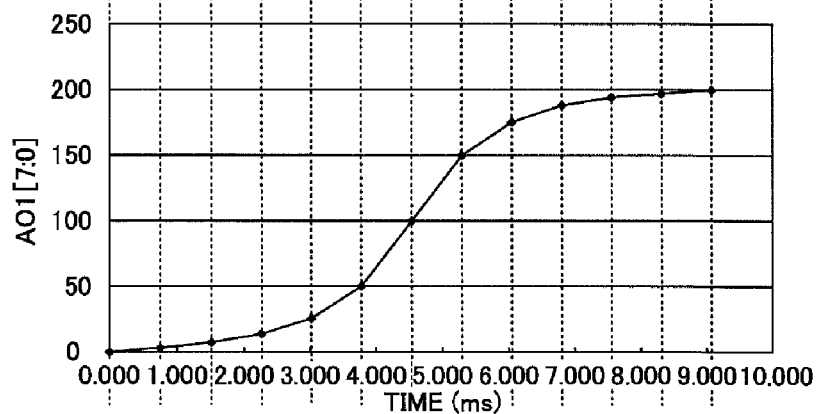
(d)

FIG.21
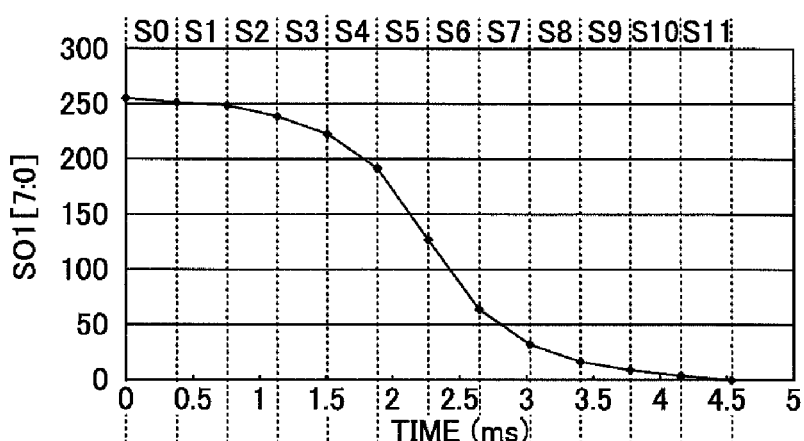
(a)
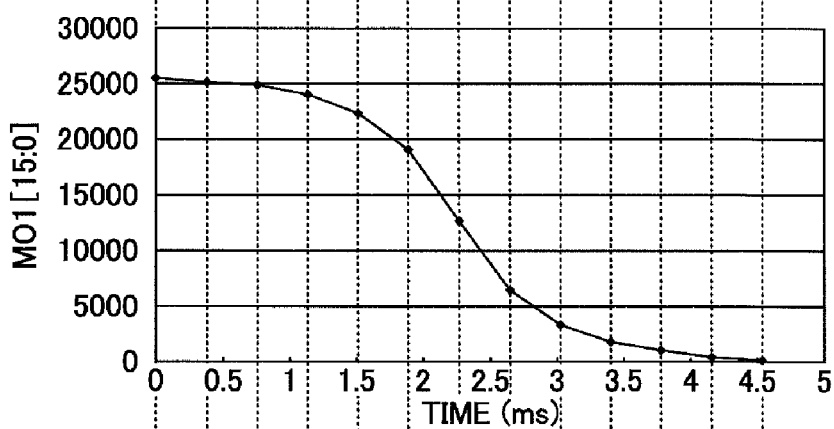
(b)
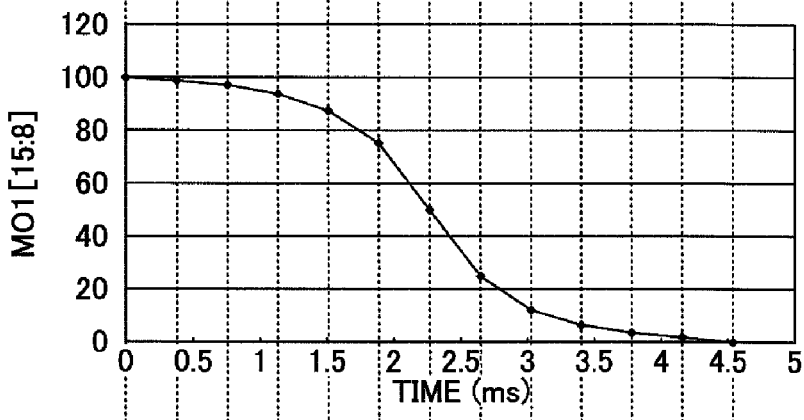
(c)
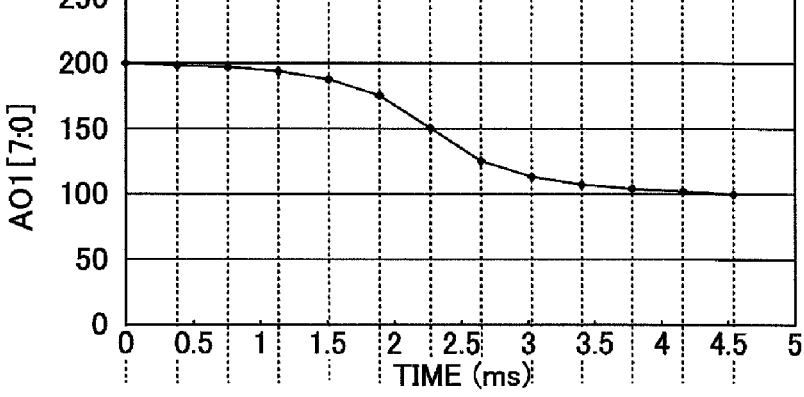
(d)

FIG.22
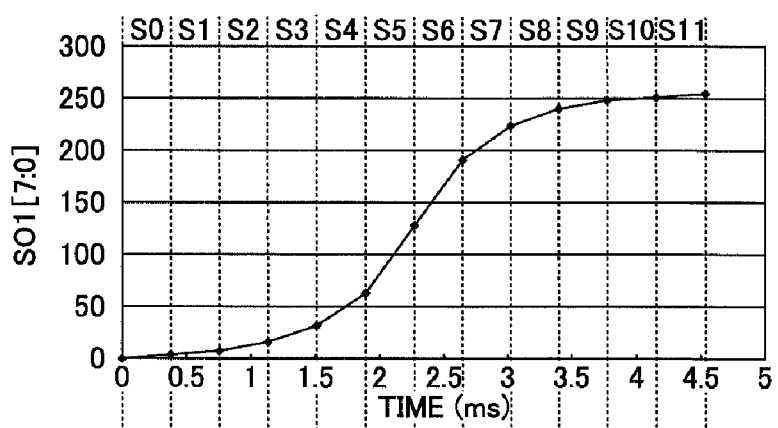
(a)
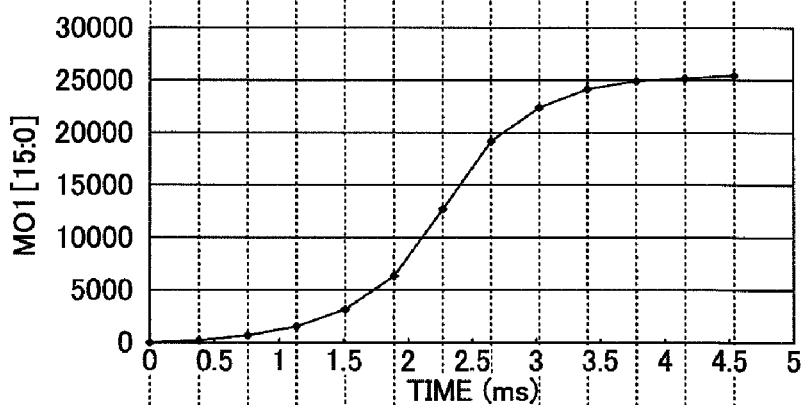
(b)
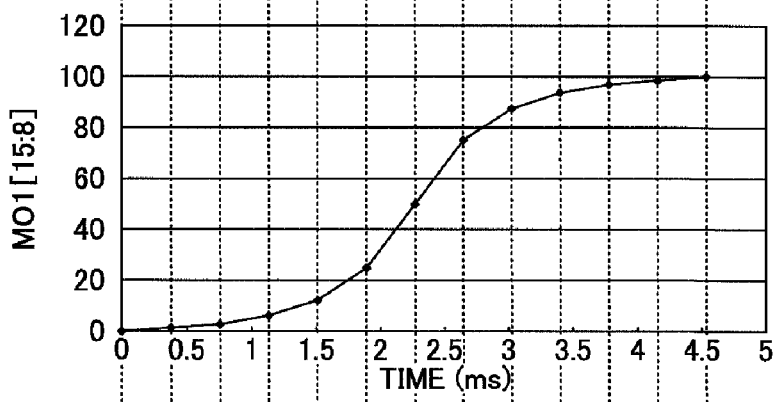
(c)
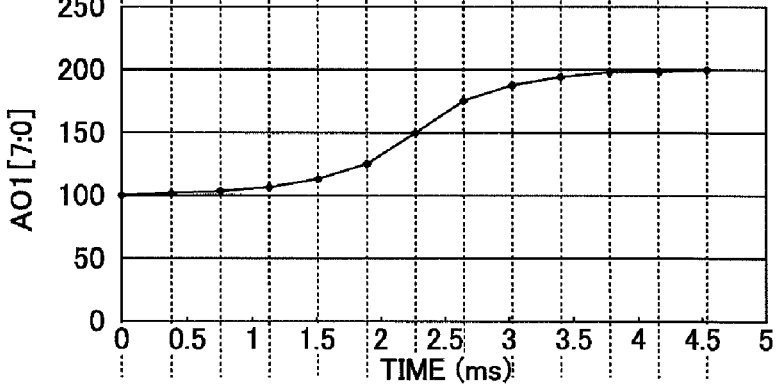
(d)

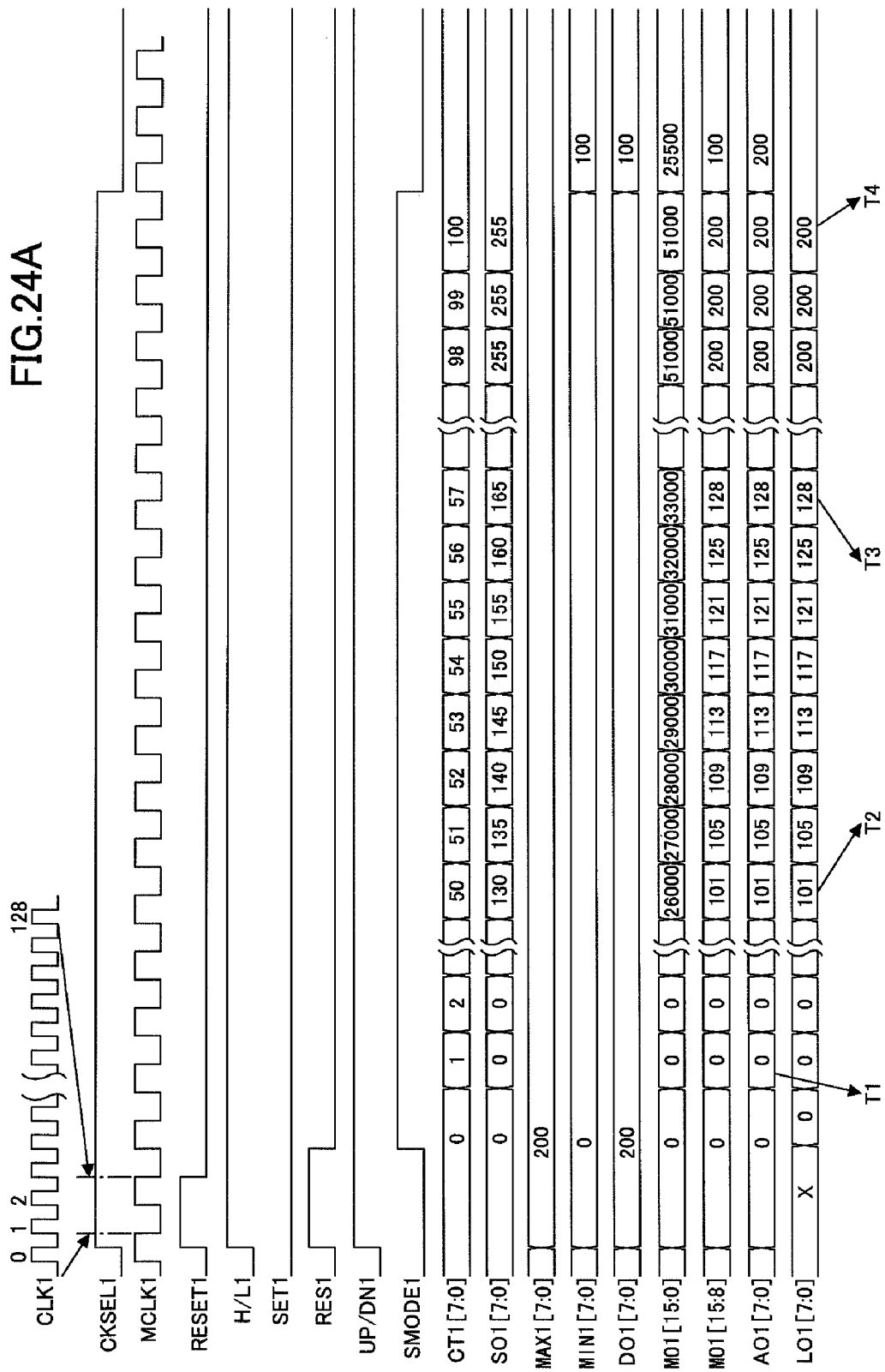

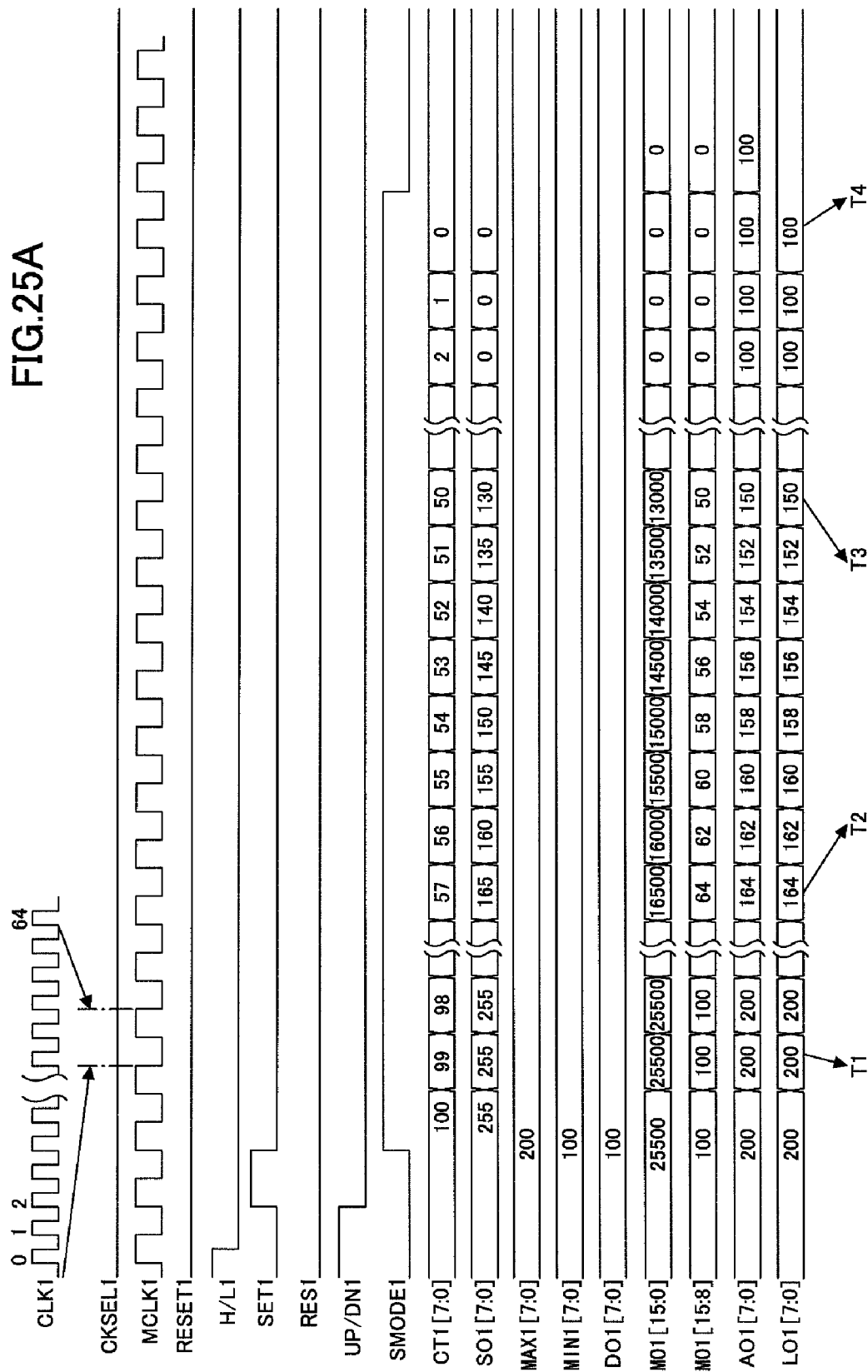

US 7,884,584 B2

SWITCHING POWER SUPPLY CIRCUIT

BACKGROUND OF THE INVENTION

1. Field of the Invention

The present invention generally relates to a switching power supply circuit including a reference voltage generating circuit capable of preventing inrush current from flowing into the switching power supply circuit and reducing overshoot when the voltage rises to a set voltage.

2. Description of the Related Art

In a switching power supply circuit, there is a technology known to a person skilled in the art to increase a reference voltage for determining an output voltage using a soft-starting circuit so that inrush current is prevented from flowing into the switching power supply circuit when the output voltage rises to a predetermined voltage on the supply of electric power.

FIG. 27 is an example of such a switching power supply circuit according to a related art.

As illustrated in FIG. 27, an error amplifying circuit 242 outputs an error voltage EAo24 obtained by amplifying the difference in voltage between a divided voltage VFB24 obtained by dividing an output voltage Vout24 at a voltage dividing resistor 246 and a reference voltage VREF24 output from a soft-starting circuit 241.

A comparator 244 compares a triangular wave signal TW24 output from a triangular wave generating circuit 243 with the error voltage EAo24, and generates and outputs a switching pulse signal Spa24 for carrying out PWM control to a switch circuit 245.

Note that soft-starting circuits, such as the aforementioned soft-starting circuit 241, are generally configured to include a capacitor and a resistor; however, in a case where the capacitor is installed in a chip, since the size of the capacitor is large, areas of the capacitor may be too large to be installed in the chip. Moreover, in a case where the capacitor is installed outside, since the number of nodes is increased, the number of components will be increased.

Therefore, there are provided some soft-starting circuits that do not use such a capacitor but use a digital signal and a DA converter instead (see Japanese Laid-Open Patent Application No. 2004-23948).

However, as illustrated in FIG. 28, when the reference voltage VREF24 ramps up in a gradual linear manner, overshoot occurs in the output voltage Vout24 which causes the output voltage Vout24 to exceed a set voltage. In such cases, a longer time may be required for stabilizing the output voltage Vout24, or an undesired defect may occur in a load supplied with the output voltage Vout24.

As a technology for reducing overshoot, as illustrated in FIG. 29, there is disclosed a method of applying the reference voltage VREF24 in a gradual changing manner such that the output voltage Vout24 is output in a gradual changing manner. Accordingly, the overshoot can be reduced when ramping up the reference voltage VREF24.

However, large inrush current still flows into a capacitor C241 as shown in FIG. 30 when ramping up the reference voltage VREF24 as shown in FIG. 29. Accordingly, harmonic noises are unfortunately increased as can be shown from a spectrum waveform in FIG. 31.

SUMMARY OF THE INVENTION

Accordingly, embodiments of the present invention may provide a novel and useful switching power supply circuit solving one or more of the problems discussed above. More specifically, the embodiments of the present invention may provide a switching power supply circuit capable of reducing noises that occur during soft-starting operation. The "soft-starting operation" used herein is defined as an operation in which a reference voltage is applied in a gradual changing manner such that an output voltage is output in a gradual changing manner during start-up of the switching power supply circuit.

One aspect of the present invention may be to provide a switching power supply circuit for generating an output voltage at an output node based on an input voltage at an input node that includes a reference voltage generating circuit configured to generate a reference voltage such that during an initial start-up period in which the reference voltage rises from zero voltage to a predetermined voltage a voltage rise rate of the reference voltage within a first predetermined period from a start point of the initial start-up period and a voltage rise rate of the reference voltage within a second predetermined period immediately preceding an end point of the initial start-up period are smaller than a voltage rise rate of the reference voltage in a period between the first predetermined period and the second predetermined period, a coil disposed between the input node and the output node, and a switch circuit configured to switch on and off to control a current running through the coil in response to comparison between the reference voltage and a voltage proportional to the output voltage.

Specifically, during the initial start-up period, the reference voltage generating circuit raises the reference voltage such that the voltage rise waveform forms a sine wave.

BRIEF DESCRIPTION OF THE DRAWINGS

FIG. 9 includes graphs (a) and (b) each illustrating a waveform generation example of reference voltage VREF1 according to an expression of trigonometric functions.

FIG. 10 is an example of waveform tables.

FIG. 20 includes graphs (a) to (d) each illustrating an operational example of the reference voltage generating circuit 11c in FIG. 18.

FIG. 21 includes graphs (a) to (d) each illustrating another operational example of the reference voltage generating circuit 11c in FIG. 18.

FIG. 22 includes graphs (a) to (d) each illustrating another operational example of the reference voltage generating circuit 11c in FIG. 18.

FIGS. 24A, 24B are timing charts illustrating an operational example of a reference voltage generating circuit 11c in FIG. 23.

FIGS. 25A, 25B are timing charts illustrating another operational example of the reference voltage generating circuit 11c in FIG. 23.

DETAILED DESCRIPTION OF THE PREFERRED EMBODIMENTS

A description is given below, with reference to FIGS. 1 through 26 of embodiments of the present invention.

First Embodiment

Figure 1:
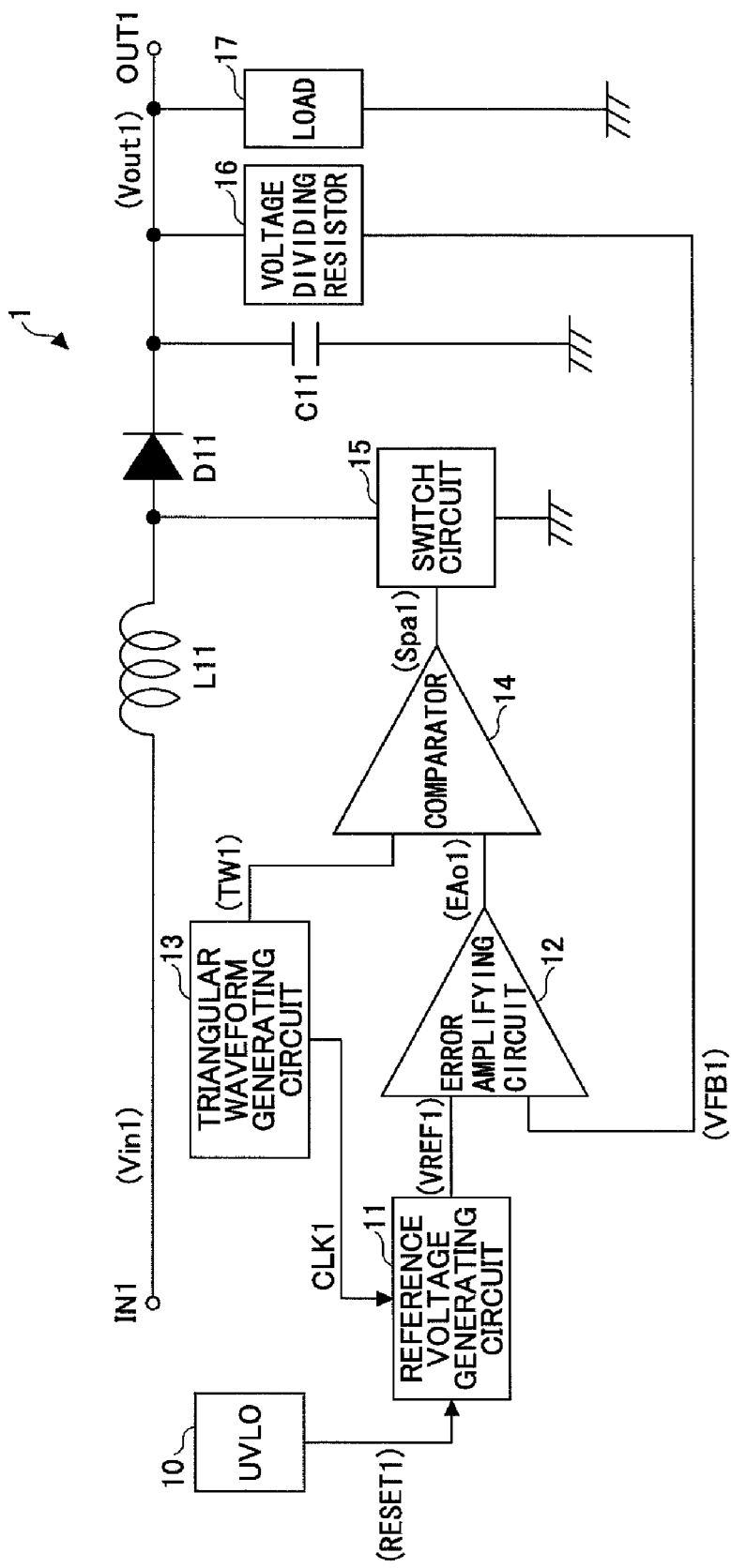
FIG. 1 is a diagram illustrating a circuit example of a switching power supply circuit according to a first embodiment of the invention.

FIG. 1 is a diagram illustrating a circuit example of a switching power supply circuit according to a first embodiment of the invention.

A switching power supply circuit 1 in FIG. 1 increases an output voltage Vout1 based on an input voltage Vin1 input to an input node IN1 to a predetermined voltage and outputs the increased output voltage Vout1 from an output node OUT1. The switching power supply circuit 1 also functions as an asynchronous rectifying type raising switching regulator to output the voltage Vout1 to a load 17 connected to the output node OUT1.

As illustrated in FIG. 1, the switching power supply circuit 1 includes a low power supply voltage malfunction preventing circuit (hereinafter, called as "UVLO") 10, a reference voltage generating circuit 11 generating and outputting a predetermined reference voltage VREF1, an error amplifying circuit 12, a triangular wave generating circuit 13 generating a predetermined clock signal CLK1 and a predetermined triangular wave signal TW1, and a comparator 14. The switching power supply circuit 1 further includes a switch circuit 15 performing switching operation to control an output voltage converted from the input voltage Vin1, a voltage dividing resistor 16 dividing the output voltage Vout1, and generating and outputting a divided voltage VFB1, a rectifying diode D11, a coil L11, and a capacitor C11 for obtaining gradual current flow.

The coil L11 is connected between the input voltage Vin1 and an anode of the rectifying diode D11, and the switch circuit 15 is connected between the anode of the rectifying diode D11 and a ground voltage. A cathode of the rectifying diode D11 is connected to the output node OUT1. The capacitor C11 is connected between the output node OUT1 and the ground voltage, and the load 17 is connected likewise between the output node OUT1 and the ground voltage. A reset signal RESET1 output from UVLO 10 controls the operation of the reference voltage generating circuit 11, to which the clock signal CLK1 generated as a reference pulse signal is input, from the triangular wave generating circuit 13. The error amplifying circuit 12 amplifies the difference in voltage between the divided voltage VFB1 and the reference voltage VREF1, and generates and outputs an error voltage EAo1. The comparator 14 compares voltages between the error voltage EAo1 and the triangular wave signal TW1, generates a pulse signal Spa1 for performing PWM control based on the comparison outcome, and outputs the pulse signal Spa1 to the switch circuit 15. The switch circuit 15 is turned ON or OFF based on the pulse signal Spa1 output from the comparator 14. The switch circuit 15 is conductive when the switch circuit 15 is turned ON whereas the switch circuit 15 is nonconductive when the switch circuit 15 is turned OFF.

In the switching power supply circuit 1 having this configuration, when a reset is released by the UVLO 10, the reference voltage generating circuit 11 starts operating and increases the reference voltage VREF1. When the reference voltage VREF1 increases, the error voltage EAo1 from the error amplifying circuit 12 rises, thereby causing the pulse width of the pulse signal Spa1 from the comparator 14 to change. As a result, the amount of time in which the switch circuit 15 is turned ON gets longer, thereby increasing the output voltage Vout1.

With these operations, the divided voltage VFB1 becomes equal to the reference voltage VREF1, and the reference voltage VREF1 rises to a set value, thereby controlling the output voltage Vout1 to be a predetermined voltage.

That is, when the output voltage Vout1 has risen, the error voltage EAo1 from the error amplifying circuit 12 lowers, thereby causing the pulse width of the pulse signal Spa1 from the comparator 14 to change. As a result, the amount of time in which the switch circuit 15 is turned ON gets shorter, thereby lowering the output voltage Vout1.

When the output voltage Vout1 has decreased, the error voltage EAo1 from the error amplifying circuit 12 rises, thereby also causing the pulse width of the pulse signal Spa1 from the comparator 14 to change. As a result, the amount of time in which the switch circuit 15 is turned ON gets longer, thereby increasing the output voltage Vout1. The switching power supply circuit 1 repeats the aforementioned operation so as to control the output voltage Vout1 so as to maintain at a constant voltage.

Figure 2:
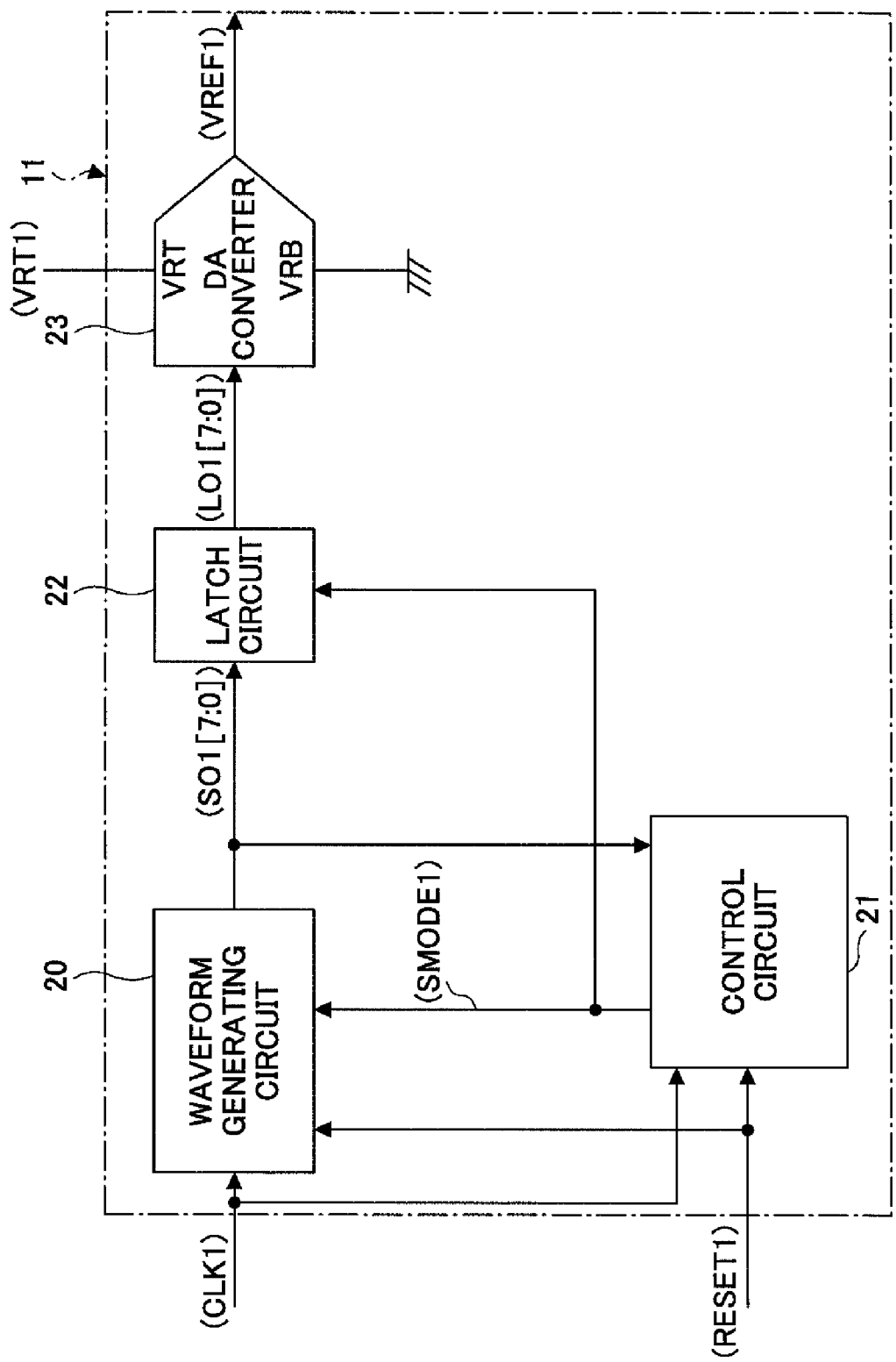
FIG. 2 is a block diagram illustrating a circuit configuration example of a reference voltage generating circuit 11 in FIG. 1.

FIG. 2 is a block diagram illustrating a circuit configuration example of a reference voltage generating circuit 11 in FIG. 1.

As illustrated in FIG. 2, the reference voltage generating circuit 11 includes a waveform generating circuit 20 determining an output waveform data, a control circuit 21 controlling operation of the waveform generating circuit 20 after the reset cancellation, a latch circuit 22 maintaining the waveform data output from the waveform generating circuit 20, and a DA converter 23 converting digital data output from the latch circuit 22 into an analog signal and outputting the analog signal. Note that the waveform generating circuit 20, the latch circuit 22 and the DA converter 23, and the control circuit 21 respectively form a waveform generating circuit section, a DA converter section, and a control circuit section.

The reset signal RESET1 output from UVLO 10 is input to the waveform generating circuit 20 and the control circuit 21 whereas the clock signal CLK1 output from the triangular wave generating circuit 13 is input to the waveform generating circuit 20 and the control circuit 21. The waveform generating circuit 20 and the control circuit 21 are synchronized by using the clock signal CLK1. A control signal SMODE1 output from the control circuit 21 is input to the waveform generating circuit 20 and the latch circuit 22, a waveform data SO1 [7:0] of 8-bit digital data output from the waveform generating circuit 20 is input to the control circuit 21 and the latch circuit 22. A digital data LO1 [7:0] output from the latch circuit 22 is converted into the reference voltage VREF1 of an analog signal to be output by the DA converter 23. Note that the DA converter 23 is supplied with a predetermined reference voltage VRT1 for use in DA conversion.

The control circuit 21 sets the control signal SMODE1 at a high level to initiate a soft-starting operation when the reset signal RESET1 is switched to a low level, and the waveform generating circuit 20 initiates data change of the waveform data SO1 [7:0]. The waveform generating circuit 20 changes the waveform data SO1 [7:0] for generating a gradual waveform by changing a count clock as the time elapses. When the waveform data SO1 [7:0] indicates a predetermined data, the control circuit 21 sets the control signal SMODE1 at the low level to stop the operation of the waveform generating circuit 20, thereby terminating the soft-starting operation.

The latch circuit 22 outputs the waveform data SO1 [7:0] as the digital data LO1 [7:0] without any change while the control signal SMODE1 stays at the high level.

By contrast, the latch circuit 22 maintains the waveform data SO1 [7:0] input when the control signal SMODE1 is switched to the low level and outputs the maintained waveform data SO1 [7:0] as the digital data LO1 [7:0]. The digital data LO1 [7:0] from the latch circuit 22 is converted from digital to analog at the DA converter 23 and the converted data is output as the reference voltage VREF1. Note that in FIG. 2, the latch circuit 22 may be omitted such that the waveform data SO1 [7:0] output from the waveform generating circuit 20 is directly input to the DA converter 23. In this case, the waveform generating circuit 20 is configured to maintain the waveform data SO1 [7:0] output when the control signal SMODE1 is switched to the low level, and output the maintained waveform data SO1 [7:0].

Figure 3:
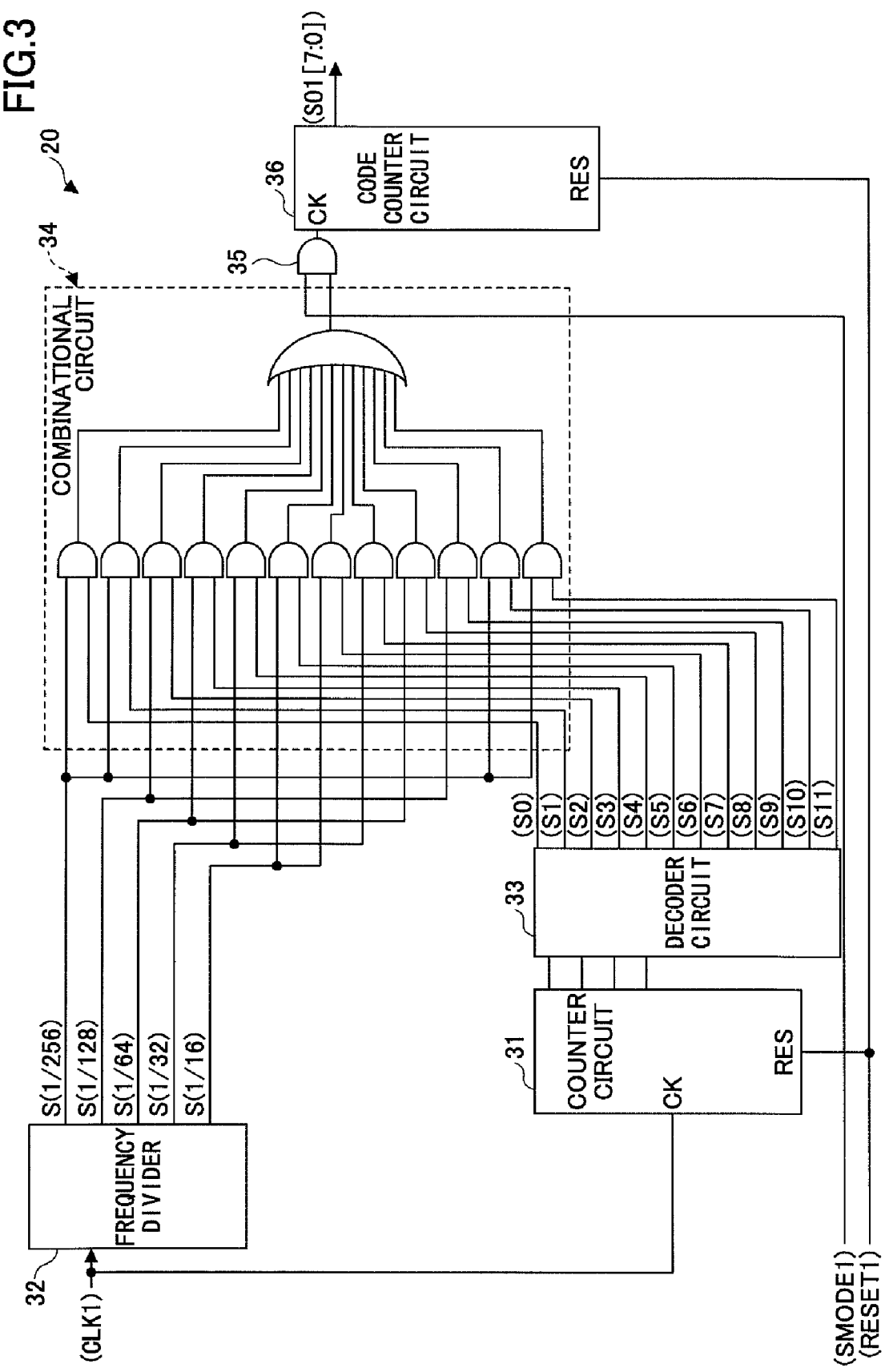
FIG. 3 is a diagram illustrating a circuit example of a waveform generating circuit 20 in FIG. 2.

FIG. 3 is a diagram illustrating a circuit example of a waveform generating circuit 20 in FIG. 2. As illustrated in FIG. 3, the waveform generating circuit 20 includes a counter circuit 31 counting the clock signal CLK1 to increment by one count for every 1024 clocks, a frequency divider 32 generating and outputting frequency divided clock signals S(1/16), S(1/32), S(1/64), S(1/128) and S(1/256) obtained by dividing the frequency of the clock signal CLK1 by 16, 32, 64, 128 and 256, and a decoder circuit 33 generating and outputting selection signals S0 to S11 for selecting the frequency divided clock signals output from the frequency divider 32 based on the signal output from the counter circuit 31.

Further, the waveform generating circuit 20 includes a combinational circuit 34 combining the selection signals S0 to S11 output from the decoder circuit 33 with the frequency divided clock signals S(1/16), S(1/32), S(1/64), S(1/128) and S(1/256) output from the frequency divider 32 using AND circuits and an OR circuit, an AND circuit 35 outputting a signal output from the combinational circuit 34 provided that the control signal SMODE1 is at a high level, and a code counter circuit 36 counting the number of pulses of a signal output from the AND circuit 35, converting the signal into 8-bit waveform data SO1 [7:0], and outputting the converted 8-bit waveform data. Note that the counter circuit 31, the frequency divider 32, the decoder circuit 33, the combinational circuit 34 and the AND circuit 35, and the code counter circuit 36 respectively form a counter circuit section, a frequency dividing section, a selection circuit section, a combinational circuit section, and code counter circuit section.

In the waveform generating circuit 20 having this configuration, the counter circuit 31 defines a length of one interval by outputting the 4-bit digital data to the decoder 33. The decoder circuit 33 receives the digital data from the counter circuit 31 and outputs the selection signals S0 to S11 each indicating one of 12 intervals, and determines a cycle of data change for each interval by selecting the frequency divided clock signals S(1/16), S(1/32), S(1/64), S(1/128) and S(1/256) at the combinational circuit 34. The waveform generating circuit 20 further includes the AND circuit 35 such that the signal output from the combinational circuit 34 is output to the code counter circuit 36 provided that the control signal SMODE1 is at the high level. The code counter 36 counts the number of pulses of the signal output from the AND circuit 35, and generates and outputs the 8-bit waveform data SO1 [7:0].

Figure 4:
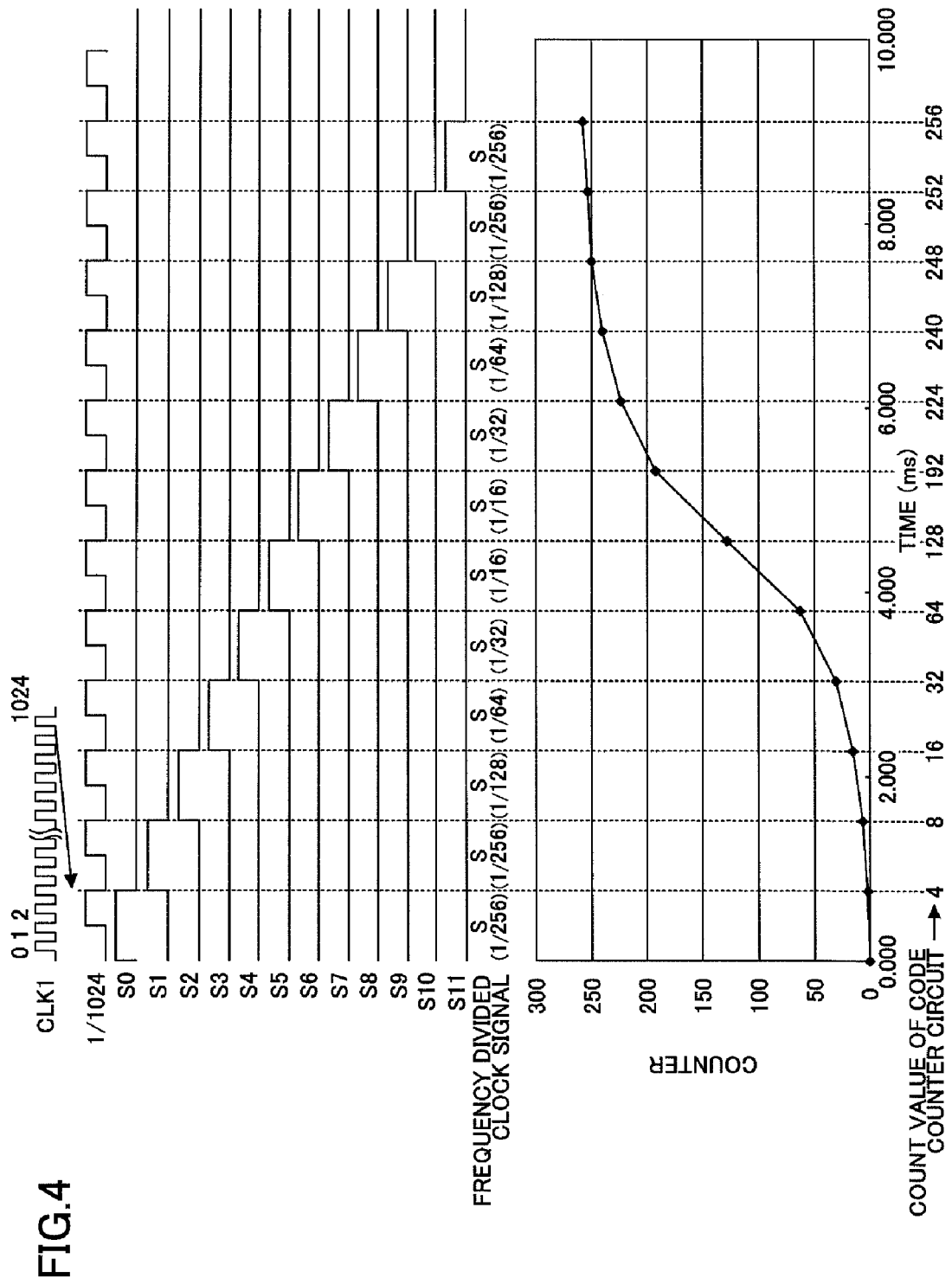
FIG. 4 is a timing chart illustrating an operational example of the waveform generating circuit 20 in FIG. 3.

FIG. 4 is a timing chart illustrating waveform examples of the signals in FIG. 3, and a more detailed operation of the waveform generating circuit 20 in FIG. 3 will be described with reference to FIG. 4.

One interval is indicated by an interval between vertical dotted lines in FIG. 4, the dotted lines each correspond to the $1024^{th}$ clock of the clock signal CLK1.

When the reset signal RESET1 is switched to the low level, the counter circuit 31 starts counting. When the selection signal S0 is switched to the high level and the counter circuit 31 finishes counting of 1024 clocks, the decoder circuit 33 sets the selection signal S0 at the low level and the selection signal S1 at the high level.

The decoder circuit 33 repeats this operation from the selection signals S0 to S11. The combinational circuit 34 determines a cycle of code count for each interval, and the code counter circuit 36 increments by one count based on the cycle. In the interval where the selection signal S0 stays at the high level, the code counter circuit 36 increments by one count for every 256 clocks, and increments four counts before the selection signal S0 is switched to the low level.

FIG. 4 shows the frequency divided clock signals selected in the corresponding intervals and values counted by the code counter circuit 36 based on the frequency divided clock signals. As can be shown from FIG. 4, the count cycles of the code counter circuit 36 in the intervals are changed by selecting one of the frequency divided clock signals of the corresponding interval, thereby changing the slope of the data waveform output from the code counter circuit 36. The 8-bit waveform data SO1 [7:0] output from the code counter circuit 36 is converted from digital to analog data by the DA converter 23 in FIG. 2 and generated as the reference voltage VREF1 exhibiting the waveform shown in FIG. 5.

Figure 5:
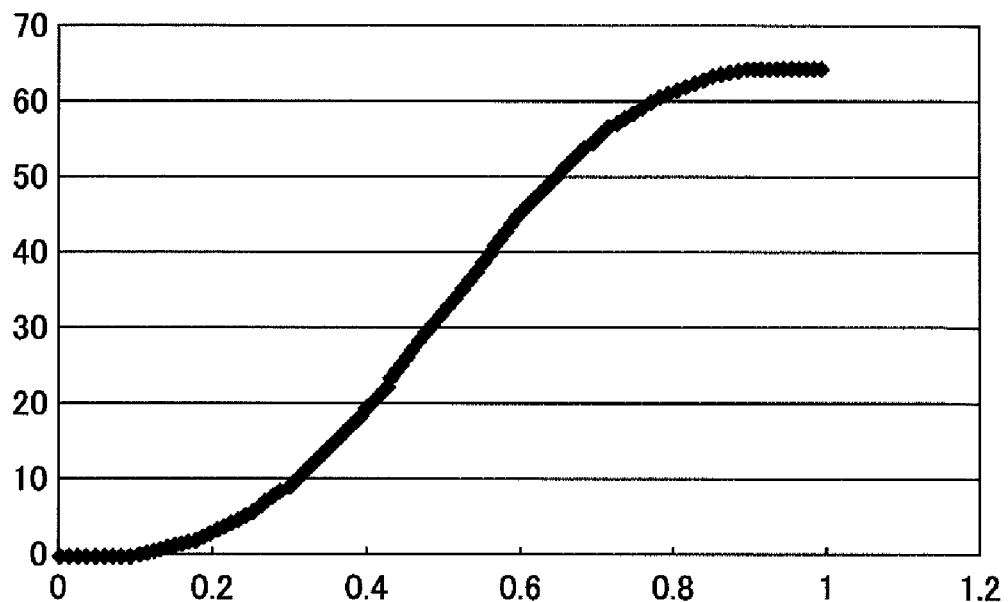
FIG. 5 is a graph illustrating a waveform example of reference voltage VFRF1.

That is, as can be shown from FIGS. 4 and 5, the reference voltage VREF1 that gradually rises to form a sine wave is generated such that during an initial start-up period in which the reference voltage rises from zero voltage to a predetermined voltage, degrees of a slope K1 of the reference voltage VREF1 within a first predetermined period from a start point of the initial start-up period and degrees of a slope K3 of the reference voltage VREF1 within a second predetermined period immediately preceding an end point of the initial start-up period are smaller than degrees of a slope K2 of the reference voltage VREF1 in a period between the first predetermined period and the second predetermined period.

Figure 6:
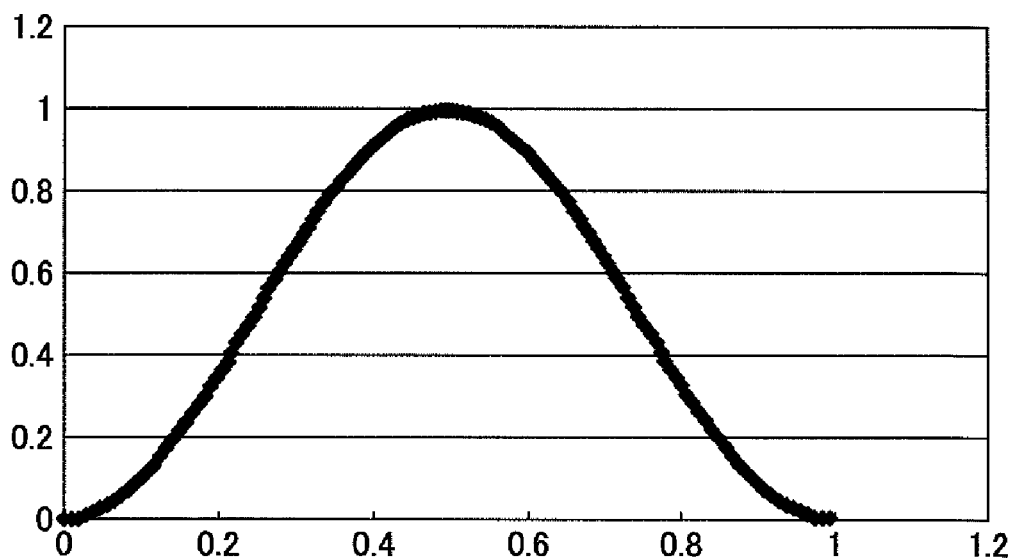
FIG. 6 is a graph illustrating a waveform example of current flowing into a capacitor C11.
Figure 7:
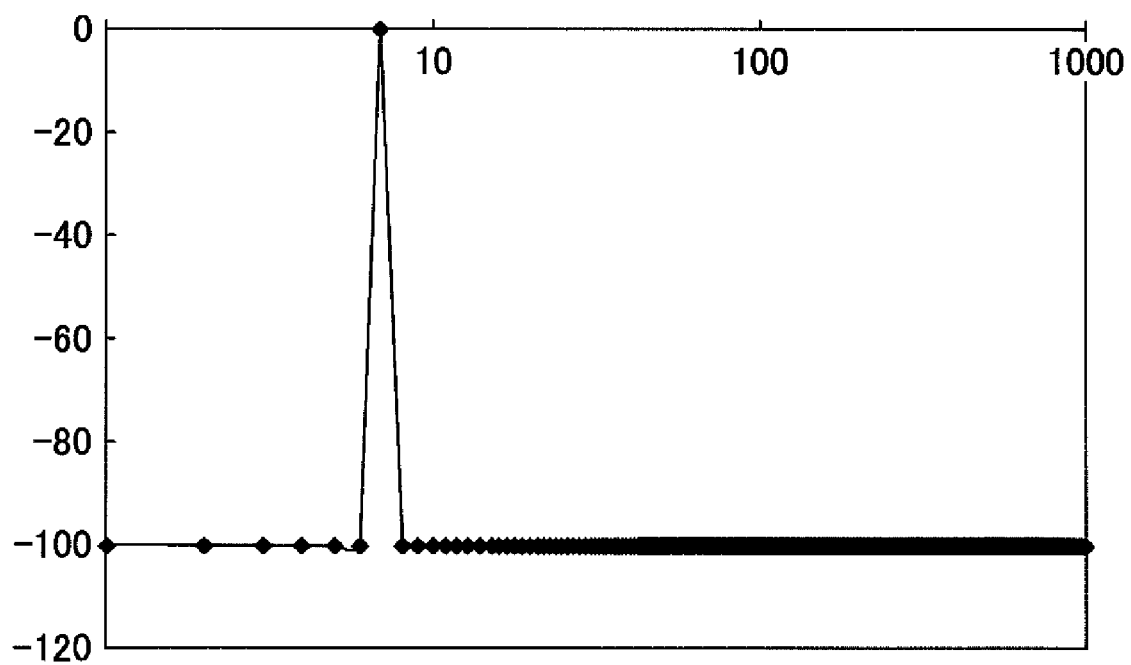
FIG. 7 is a spectrum waveform diagram illustrating an example of harmonic noises.
Figure 31:
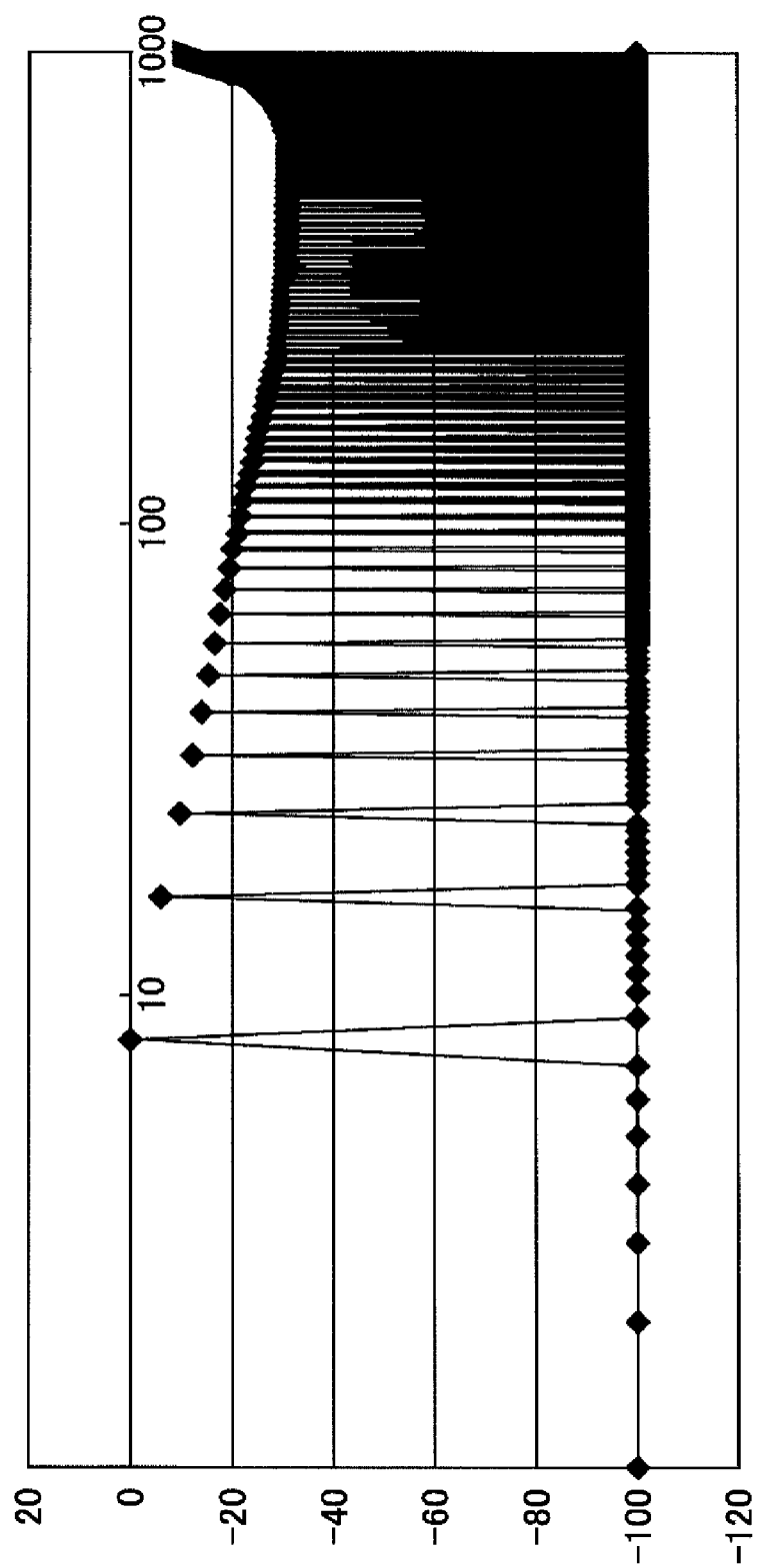
FIG. 31 is a spectrum waveform diagram illustrating an example of harmonic noises according to the related art.

Accordingly, since the current flows into the capacitor C11 as illustrated in FIG. 6, inrush current can be prevented from flowing into the capacitor C11; that is, the spectrum waveform in FIG. 31 is changed to that in FIG. 7. As a result, the harmonic noises can be reduced to a large extent.

Further, when the reset signal RESET1 is switched to the high level, count data of the counter circuit 31 and code counter circuit 35 are reset. The signal output from the combinational circuit 34 is output to the code counter circuit 36 provided that the control signal SMODE1 is at the high level.

Note that the aforementioned description is not limited thereto, and a counting system by the counter circuit 31, frequencies divided by the frequency divider 32, the number of intervals determined by the decoder circuit 33, combinations determined by the combinational circuit 34, the number of bits output by the code counter circuit 36, and the like can optionally be changed and adjusted.

Thus, since the switching power supply circuit according to the first embodiment is configured such that the reference voltage VREF1 after turning on the power supply includes the waveform shown in FIG. 5, the noises that occur during the soft-starting operation can be reduced to a large extent. With the switching power supply circuit according to the first embodiment, since the output voltage after turning on the power supply can gradually rise up without largely consuming the capacitance, the overshoot that occurs during the output voltage start-up can be reduced. Moreover, in the switching power supply circuit according to the first embodiment, since the value of the reference voltage VREF1 or the set voltage of the output voltage Vout1 can be changed by changing the predetermined reference voltage VRT1 of the DA converter 23 in FIG. 2 and rise-up time of the reference voltage VREF1 can be adjusted by changing count cycles of the counter circuit 31 in FIG. 3, engineering time for installation in other circuits may be reduced. Further, with the switching power supply circuit according to the first embodiment, the noises that occur during the start-up of the output voltage can be reduced to the minimum while the output voltage rises up quickly.

Second Embodiment

Figure 8:
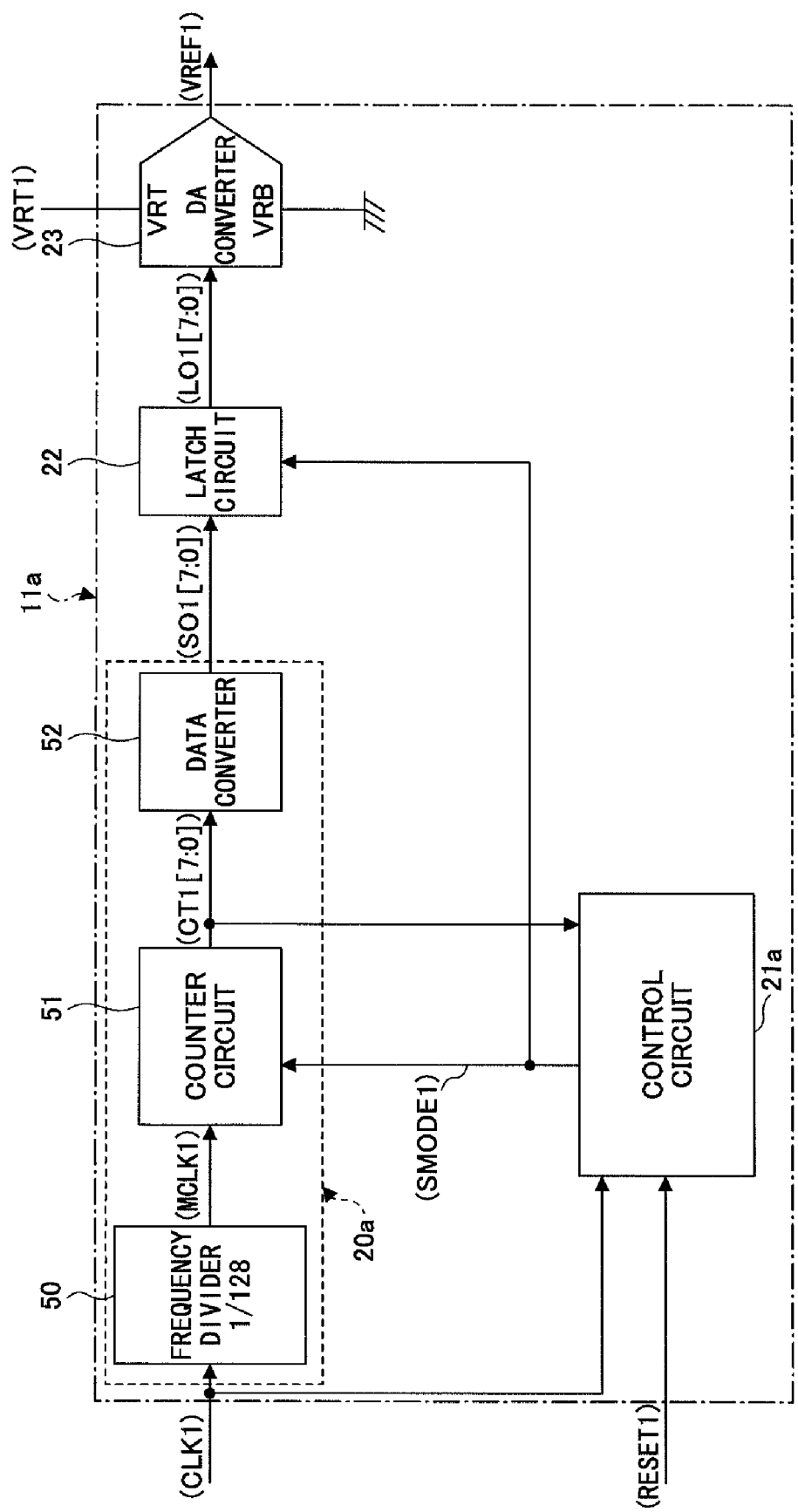
FIG. 8 is a block diagram illustrating a circuit configuration example of a waveform generating circuit in a switching power supply circuit according to a second embodiment of the invention.

FIG. 8 is a block diagram illustrating a circuit configuration example of a switching power supply circuit according to a second embodiment of the invention. Note that a diagram illustrating the circuit configuration example of the switching power supply circuit according to the second embodiment is identical to that in FIG. 1 except that the reference numeral 11 given to the reference voltage generating circuit in FIG. 1 is 11a, and illustration thereof is thus omitted. In FIG. 8, components either identical or similar to those in FIG. 2 are given by the same reference numerals, and descriptions thereof are thus omitted. Only the configuration differing from that in FIG. 2 will be described below.

The configuration difference between FIG. 8 and FIG. 2 is as follows. In FIG. 8, the waveform generating circuit 20 in FIG. 2 is configured to include a frequency divider 50, a counter circuit 51 and a data converter 52. The reference voltage generating circuit 11 and the waveform generating circuit 20 in FIG. 2 respectively correspond to a reference voltage generating circuit 11a and a waveform generating circuit 20a in FIG. B.

As illustrated in FIG. 8, the reference voltage generating circuit 11a includes the waveform generating circuit 20a determining an output waveform data, the control circuit 21 controlling operation of the waveform generating circuit 20a after the reset cancellation, the latch circuit 22 maintaining the waveform data output from the waveform generating circuit 20a, and the DA converter 23 converting digital data output from the latch circuit 22 into an analog signal and outputting the analog signal.

The waveform generating circuit 20a includes the frequency divider 50 dividing the frequency of the clock signal CLK1 output from the triangular wave generating circuit 13, the counter circuit 51 counting the number of pulses of a frequency divided clock signal MCLK1 output from the frequency divider 50 and outputting count data CT1 [7:0] indicating the counted value, and the data converter 52 converting the count data CT1 [7:0] output from the counter circuit 51 into waveform data SO1 [7:0] by a predetermined method and outputting the converted data. Note that the frequency divider 50, the counter circuit 51, and the data converter 52 respectively form a frequency dividing section, a counter circuit section, and a data converter section.

The reset signal RESET1 output from UVLO 10 is input to the control circuit 21, and the clock signal CLK1 from the triangular wave generating circuit 13 is input to the frequency divider 50 and the control circuit 21. The control signal SMODE1 output from the control circuit 21 is input to the counter circuit 51 and latch circuit 22, and the frequency divided clock signal MCLK1 output from the frequency divider 50 is input to the counter circuit 51. The B-bit count data CT1 [7:0] output from the counter 51 is input to the data converter 52, and 8-bit waveform data SO1 [7:0] output from the data converter 52 is input to the latch circuit 22.

In the switching power supply circuit having such a configuration, the data converter 52 that determines which waveform data SO1 [7:0] is output based on the count data CT1 [7:0] will be described below.

The data converter 52 generates the waveform data SO1 [7:0] based on the expression of trigonometric functions as shown in FIG. 9. Note that (a) and (b) in FIG. 9 each illustrate a one-cycle sine wave as one example. The values of the sine wave in FIG. 9(a) that are progressively added result in a waveform shown in FIG. 9(b), whereby the waveform is used for a rise waveform. In FIG. 9(b), the horizontal axis indicates addresses including 0 to 100 whereas the vertical axis indicates codes including a maximum of eight bits. FIG. 10 is an example of the waveform table including the addresses and codes; however, address numbers and number of bits for the codes given in the waveform table are only an example and are not limited thereto. Any address numbers and any number of bits for the codes can optionally be set.

Figure 11:
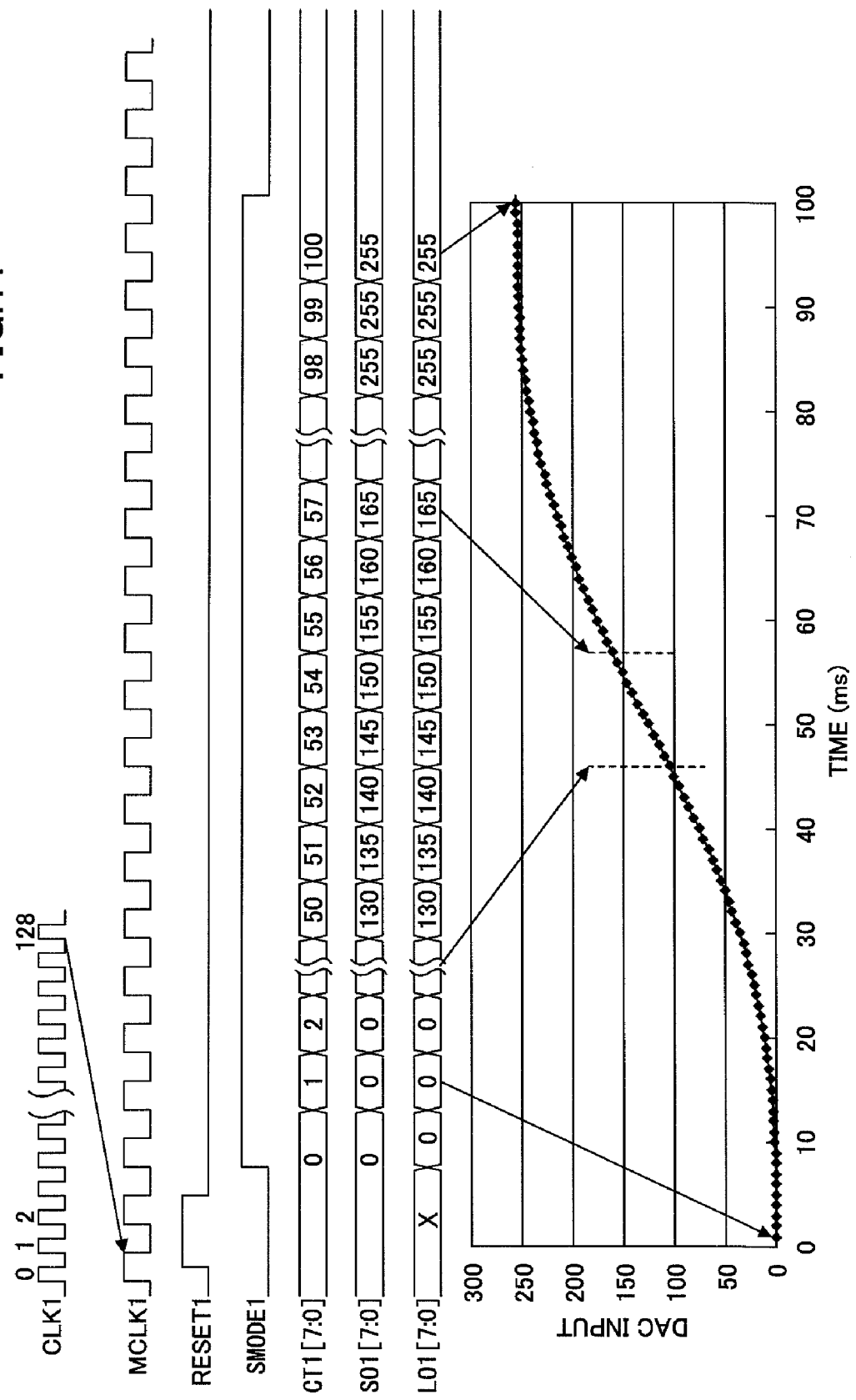
FIG. 11 is a timing chart illustrating an operational example of a reference voltage generating circuit 11a in FIG. 8.

FIG. 11 is a timing chart illustrating examples of the signals in FIG. 8, and operation of the reference voltage generating circuit 11a in FIG. 8 will be described with reference to FIG. 11.

The frequency divider 50 divides the frequency of the clock signal CLK1 output from the triangular wave generating circuit 13 by 128, and generates and outputs the frequency divided clock signals MCLK1. When the reset signal RESET1 output from the UVLO 10 is switched to a low level, the control signal SMODE1 is switched to a high level, thereby initiating soft-starting operation. When soft-starting operation is initiated, the counter circuit 51 starts counting the number of pulses of input frequency divided clock signals MCLK1 and outputs 8-bit count data CT1 [7:0] indicating the counted value.

The data converter 52 generates and outputs the waveform data SO1 [7:0] using the waveform table shown in FIG. 10. Specifically, the data converter 52 uses the count data CT1 [7:0] as an address in FIG. 10, and outputs a code corresponding to the address as 8-bit waveform data SO1 [7:0]. If the address of the count data CT1 [7:0] obtains a predetermined data, such as 100, the control circuit 21 switches the control signal SMODE1 to the low level, thereby terminating the soft-starting operation.

When the soft-starting operation is terminated, the latch circuit 22 outputs the waveform data SO1 [7:0] as the digital data LO1 [7:0] without any change while the control signal SMODE1 stays at the high level. By contrast, the latch circuit 22 maintains the waveform data SO1 [7:0] input when the control signal SMODE1 is switched to the low level and outputs the maintained waveform data SO1 [7:0] as the digital data LO1 [7:0]. The digital data LO1 [7:0] is input to the DA converter 23, which converts input digital data LO1 [7:0] into analog data and outputs the analog data as the reference voltage VREF1.

Note that the reference voltage generating circuit 11a in FIG. 8 is only one example, and the latch circuit 22 may be omitted such that the waveform data SO1 [7:0] output from the data converter 52 is directly input to the DA converter 23. In this case, the counter circuit 51 is configured such that the counter circuit 51 maintains and outputs the counted data output when the control signal SMODE1 is switched to the low level.

Thus, the switching power supply circuit according to the second embodiment exhibits similar effectiveness as that of the first embodiment, and the rise time of the reference voltage VREF1 can be adjusted by adjusting the frequency dividing ratio of the frequency divider 50.

Third Embodiment

Figure 12:
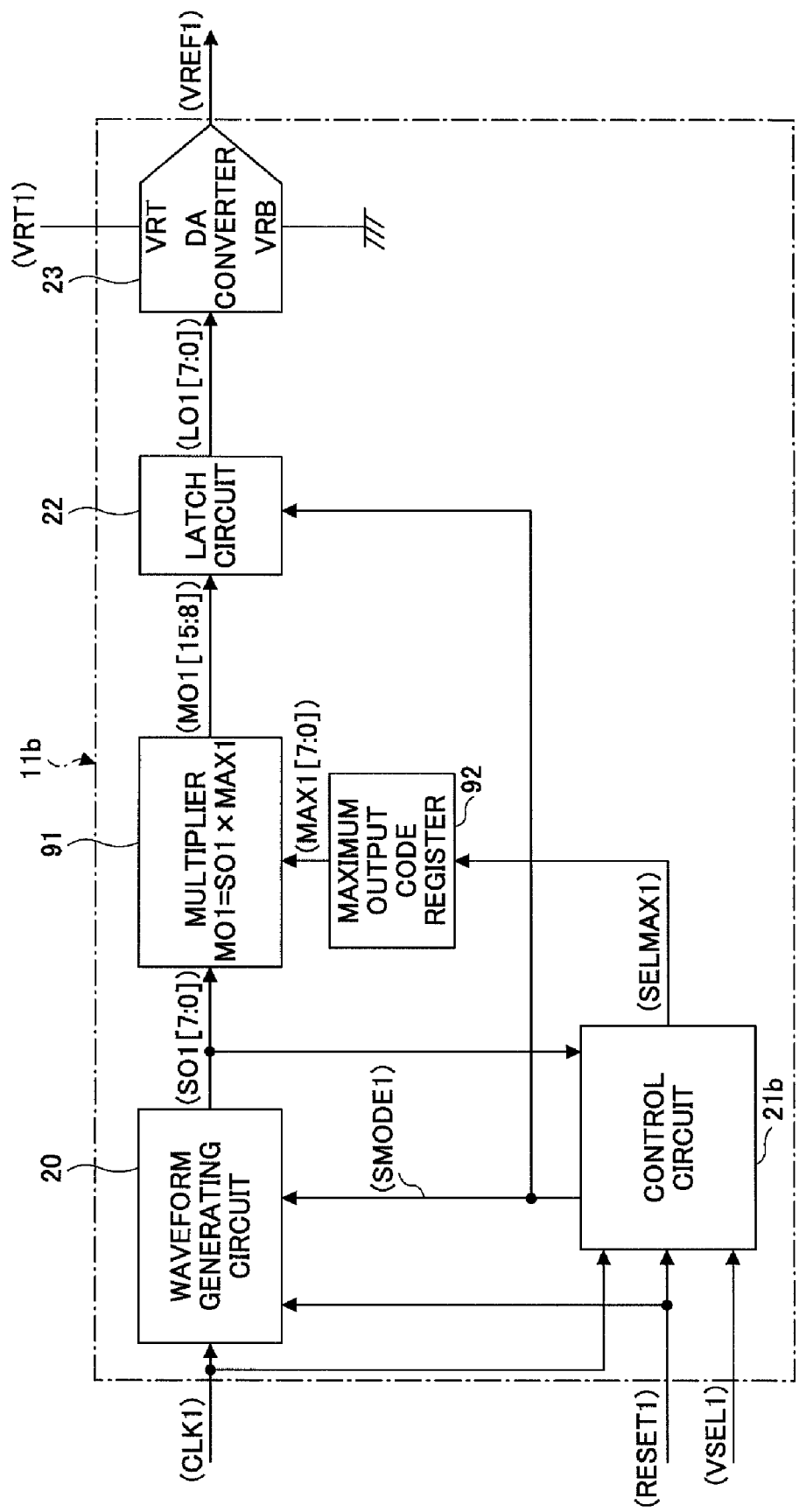
FIG. 12 is a block diagram illustrating a circuit configuration example of a switching power supply circuit according to a third embodiment of the invention.

FIG. 12 is a block diagram illustrating a circuit configuration example of a switching power supply circuit according to a third embodiment of the invention.

Note that a diagram illustrating the circuit configuration example of the switching power supply circuit according to the third embodiment is identical to that in FIG. 1 except that the reference numeral 11 given to the reference voltage generating circuit in FIG. 1 is 11b, and illustration thereof is thus omitted. In FIG. 12, components either identical or similar to those in FIG. 2 are given by the same reference numerals, and descriptions thereof are thus omitted. Only the configuration differing from that in FIG. 2 will be described below.

The configuration difference between FIG. 12 and FIG. 2 is as follows. In FIG. 12, the control circuit 21 in FIG. 2 corresponds to a control circuit 21b, and a multiplier 91 and a maximum output code register 92 are added thereto. The reference voltage generating circuit 11 in FIG. 2 corresponds to the reference voltage circuit 11b in FIG. 12.

In FIG. 12, the reference voltage generating circuit 11b includes a waveform generating circuit 20, the control circuit 21b controlling operation of the waveform generating circuit 20 after reset cancellation, the multiplier 91, the maximum output code register 92, a latch circuit 22 maintaining data output from the multiplier 91, and a DA converter 23. Note that the control circuit 21b, the multiplier 91, and the maximum output code register 92 respectively form a control circuit section, a multiplier section, and a maximum output code storage section. The control circuit 21b outputs the control signal SMODE1 based on the clock signal CLK1 output from the triangular waveform generating circuit 13 and the reset signal RESET1, and outputs a maximum output code setting signal SELMAX1 to the maximum output code register 92 based on a signal VSEL1 input from outside.

The multiplier 91 multiplies the waveform data SO1 [7:0] output from the waveform generating circuit 20 by the maximum output code MAX1 [7:0] input from the maximum output code register 92, and outputs the digital data MO1 [15:8] formed of the higher-order 8 bit data indicating the multiplied outcome. The latch circuit 22 outputs the input digital data MO1 [15:8] as the digital data LO1 [7:0] without any change while the control signal SMODE1 stays at the high level. By contrast, the latch circuit 22 maintains the digital data MO1 [15:8] input when the control signal SMODE1 is switched to the low level and outputs the maintained digital data MO1 [15:8] as the digital data LO1 [7:0].

In the reference voltage generating circuit 11b having such a configuration, when the reset signal RESET1 is switched to the low level, the control circuit 21b switches the control signal SMODE1 to the high level to initiate the soft-starting operation, and the waveform generating circuit 20 starts operating. When the waveform data SO1 [7:0] output from the waveform generating circuit 20 indicates a predetermined data, the control circuit 21b switches the control signal SMODE1 to the low level, thereby initiating the soft-starting operation. The control circuit 21b outputs the maximum output code setting signal SELMAX1 to the maximum output code register 92 based on the input signal VSEL1.

Figure 13:
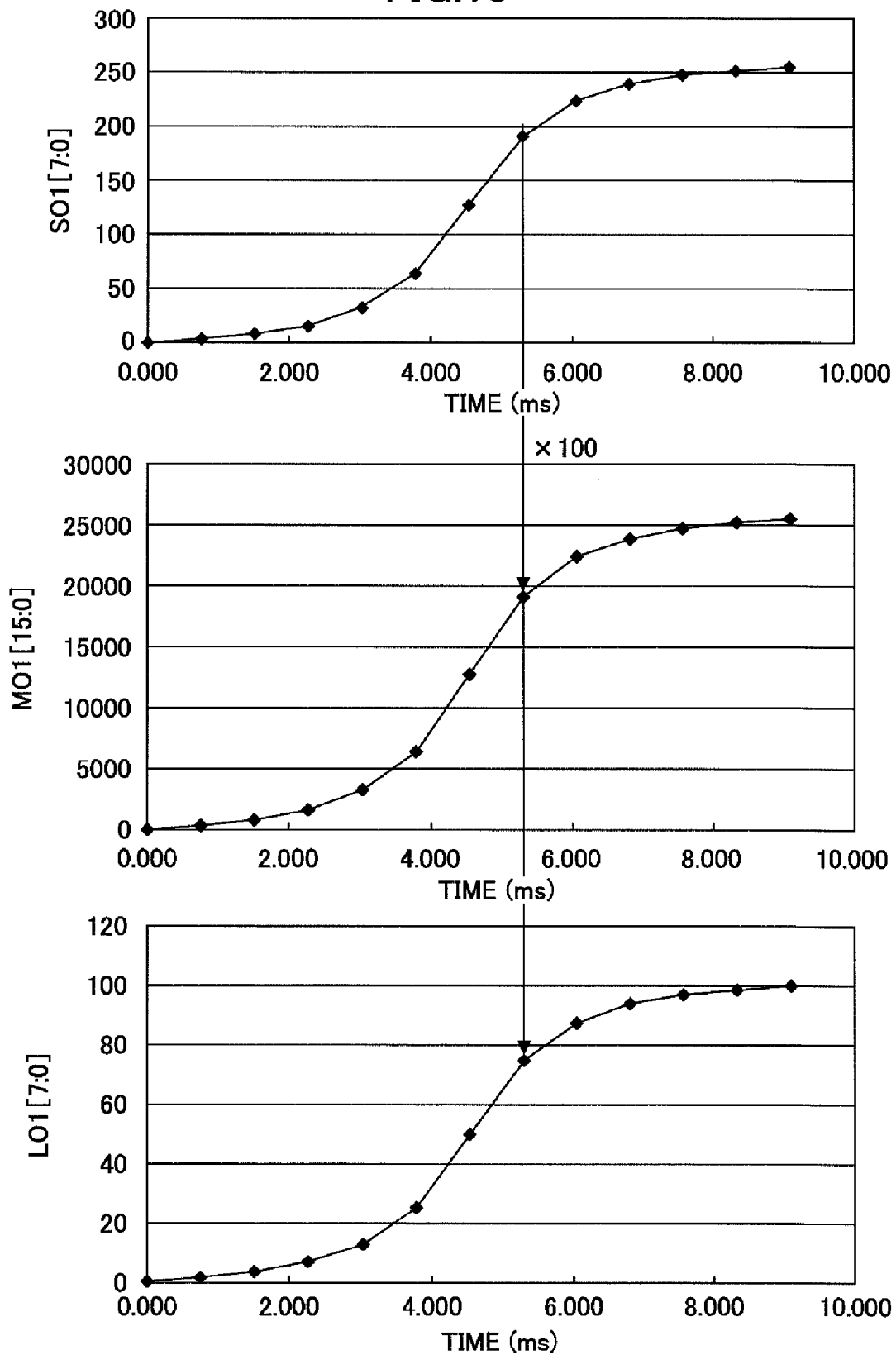
FIG. 13 is a diagram illustrating an operational example of a reference voltage generating circuit 11b in FIG. 12.
Figure 14:
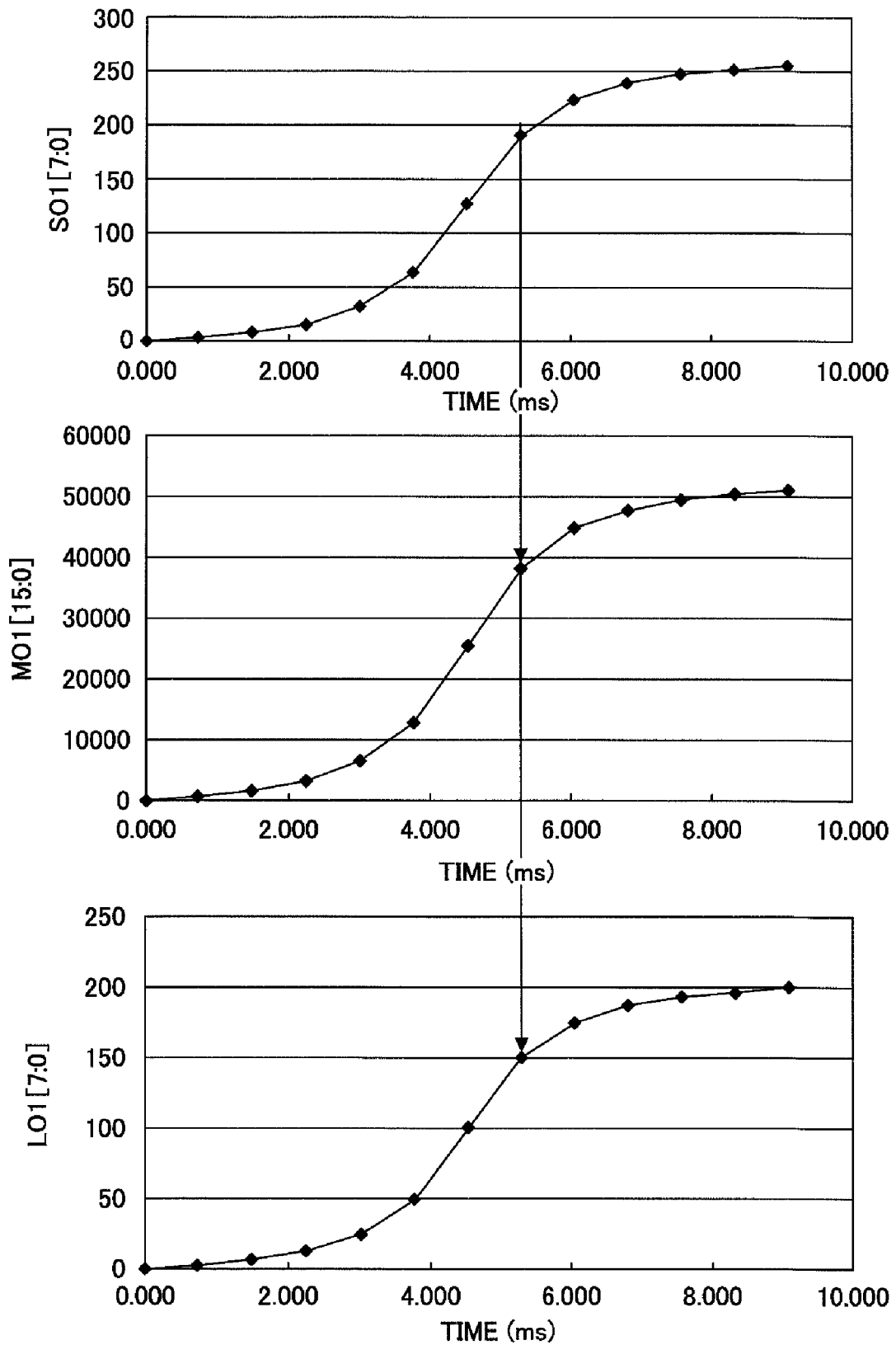
FIG. 14 is a diagram illustrating another operational example of a reference voltage generating circuit 11b in FIG. 12.

For example, the control circuit 21b outputs the signal SELMAX1 to the maximum output code register 92 such that the maximum output code MAX1 [7:0] indicates 100 when the signal VSEL1 is switched to the low level whereas the maximum output code MAX1 [7:0] indicates 200 when the signal VSEL1 is switched to the high level. FIG. 13 illustrates the digital data MO1 [15:8] and LO1 [7:0] corresponding to the waveform data SO1 [7:0] when the signal VSEL1 is switched to the low level, whereas FIG. 14 illustrates the digital data MO1 [15:8] and LO1 [7:0] corresponding to the waveform data SO1 [7:0] when the signal VSEL1 is switched to the high level.

Figure 15:
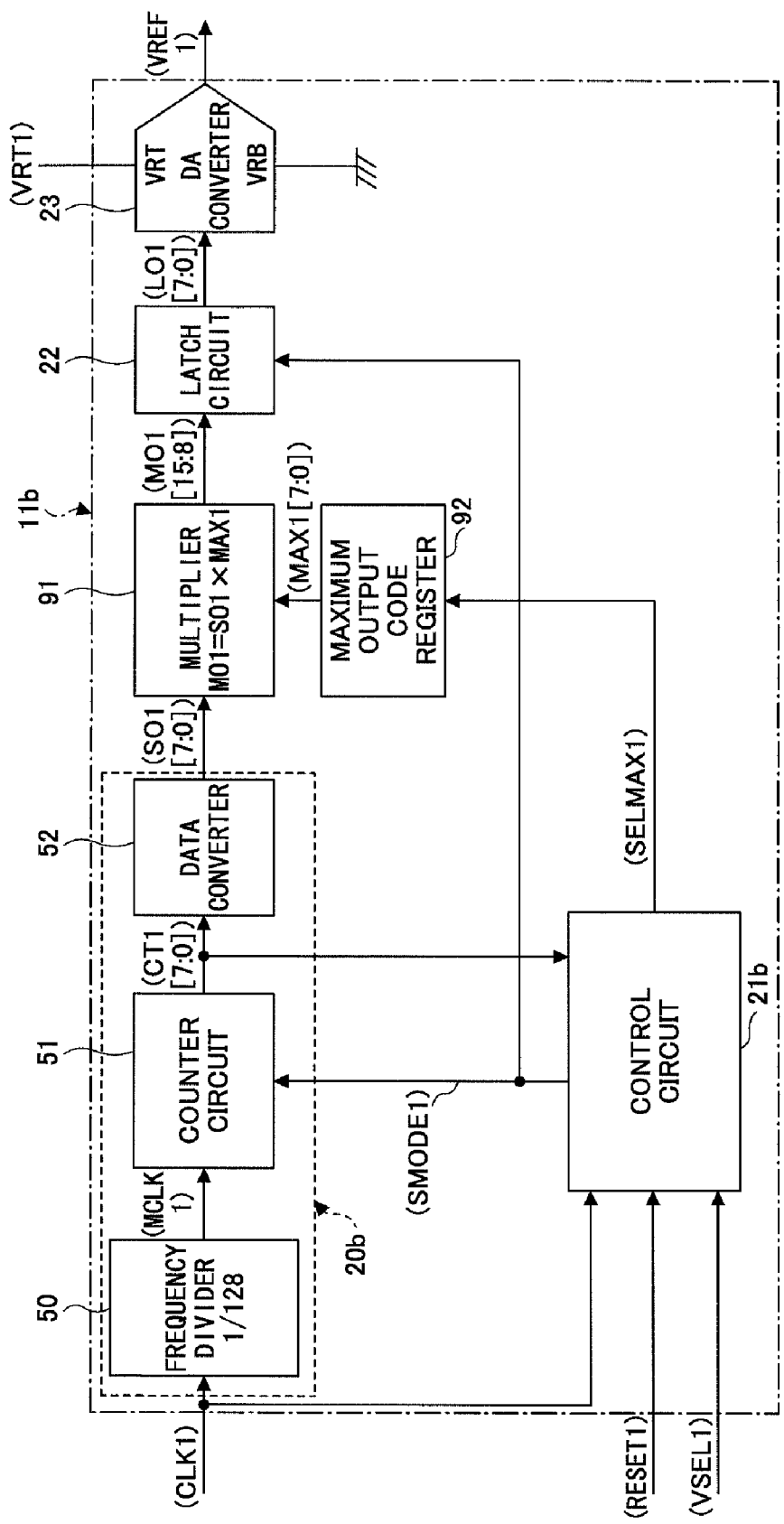
FIG. 15 is a block diagram illustrating a circuit configuration example of a switching power supply circuit according to a third embodiment of the invention.

FIG. 12 only illustrates an example where the multiplier 91 and the maximum output code register 92 are provided in the circuit configuration of FIG. 2; however, the example may also be configured such that the multiplier 91 and the maximum output code register 92 may be provided in the circuit configuration of FIG. 8, as shown in FIG. 15. In FIG. 15, components either identical or similar to those in FIG. 12 are given by the same reference numerals, and descriptions thereof are thus omitted. Only the configuration differing from that in FIG. 12 will be described below.

In FIG. 15, the reference voltage generating circuit 11b includes a waveform generating circuit 20a, the control circuit 21b controlling operation of the waveform generating circuit 20a after reset cancellation, the multiplier 91, the maximum output code register 92, the latch circuit 22 maintaining data output from the multiplier 91, and the DA converter 23 converting the data output from the latch circuit 22 into an analog data.

The control circuit 21b outputs the control signal SMODE1 based on the clock signal CLK1 output from the triangular waveform generating circuit 13 and the reset signal RESET1, and outputs a maximum output code setting signal SELMAX1 to the maximum output code register 92 based on a signal VSEL1 input from outside.

The multiplier 91 multiplies the waveform data SO1 [7:0] output from the waveform generating circuit 20a by the maximum output code MAX1 [7:0] input from the maximum output code register 92, and outputs the digital data MO1 [15:8] indicating the higher-order 8 bit data indicating the multiplied outcome. The latch circuit 22 outputs the input digital data MO1 [15:8] as the digital data LOT [7:0] without any change while the control signal SMODE1 stays at the high level. By contrast, the latch circuit 22 maintains the digital data MO1 [15:8] input when the control signal SMODE1 is switched to the low level and outputs the maintained digital data MO1 [15:8] as the digital data LO1 [7:0].

Figure 16:
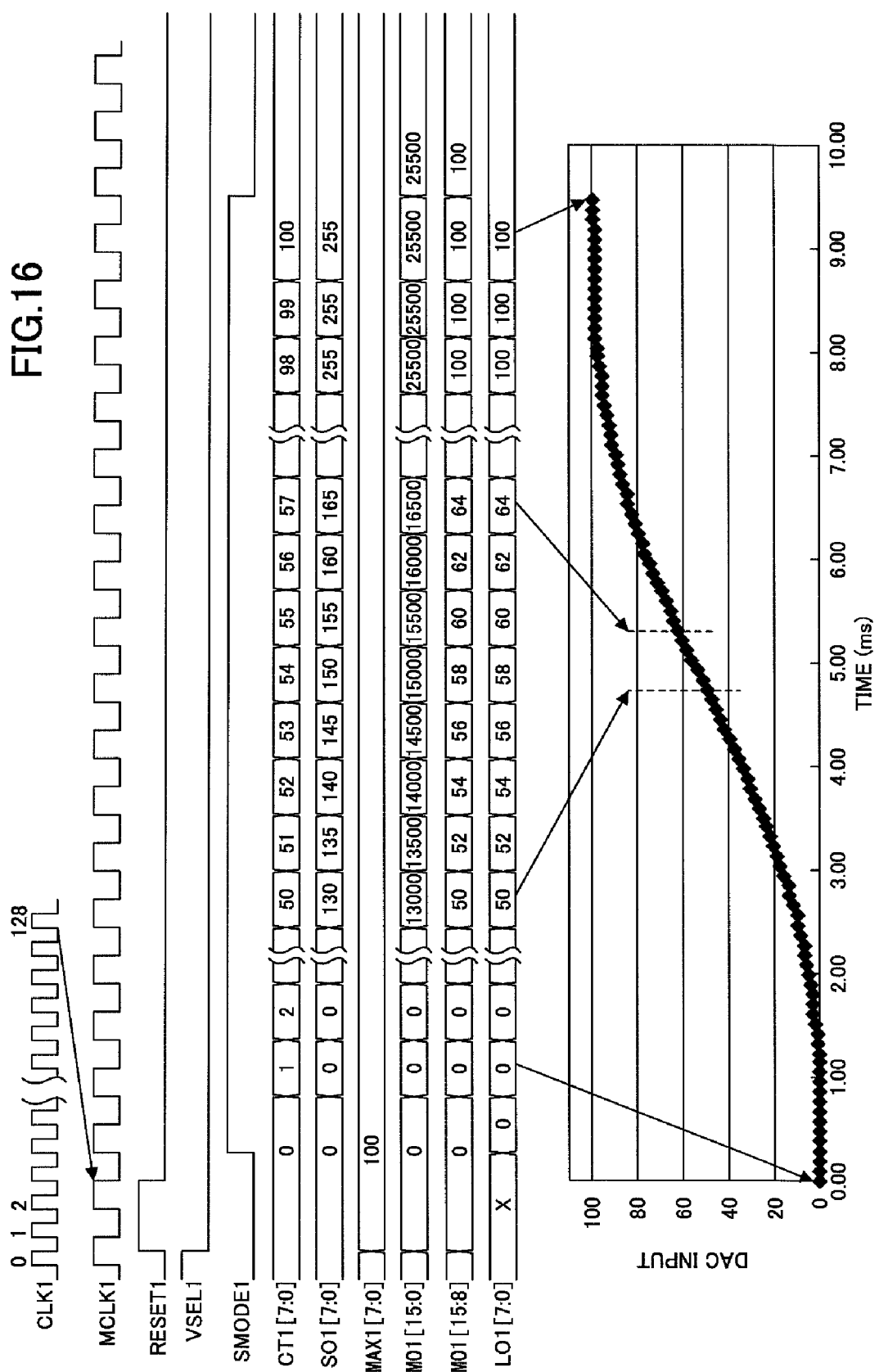
FIG. 16 is a timing chart illustrating an operational example of a reference voltage generating circuit 11b in FIG. 15.
Figure 17:
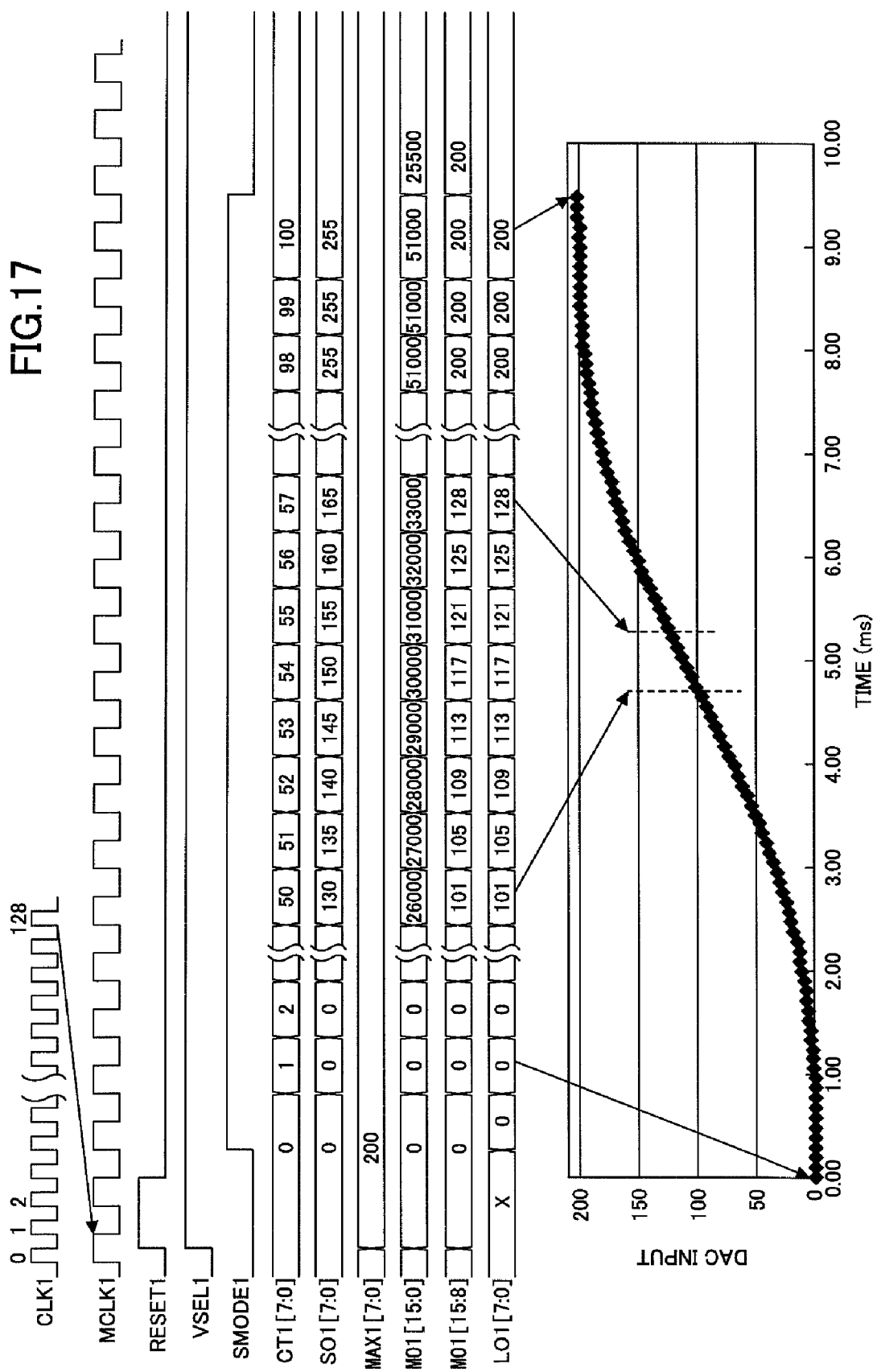
FIG. 17 is a timing chart illustrating another operational example of the reference voltage generating circuit 11b in FIG. 15.

FIG. 16 is a timing chart illustrating the signals in FIG. 15 when the signal VSEL1 is switched to the low level whereas FIG. 17 is a timing chart illustrating the signals in FIG. 15 when the signal VSEL1 is switched to the high level.

As illustrated in FIG. 16, the multiplier 91 multiplies the waveform data SO1 [7:0] by 100 to obtain 16-bit digital data MO1 [15:0] as the multiplied outcome, and outputs the digital data MO1 [15:8] indicating the higher-order 8 bit data.

The latch circuit 22 outputs the digital data MO1 [15:8] as the digital data LOT [7:0] without any change while the control signal SMODE1 stays at the high level. By contrast, the latch circuit 22 maintains the digital data MO1 [15:8] input when the control signal SMODE1 is switched to the low level and outputs the maintained digital data MO1 [15:8] as the digital data LO1 [7:0]. The digital data LO1 [7:0] is converted from digital to analog data at the DA converter 23 and the converted data is output as the reference voltage VREF1. The reference voltage generating circuit 11b performs operation similar to that shown in FIG. 17 when the signal VSEL1 is switched to the high level.

Note that the circuit configuration illustrated in FIGS. 12 and 15 is only one example, in which two types of data 100 and 200 are stored in the maximum output code register 92; however, the circuit may be configured such that the data may optionally be input to the maximum output code register 92 from outside.

Thus, the switching power supply circuit according to the third embodiment exhibits similar effectiveness as that of the first embodiment, and since the maximum output code can be set thereto, the value of the reference voltage VREF1, that is, the set value of the output voltage Vout1 can be changed.

Fourth Embodiment

Figure 18:
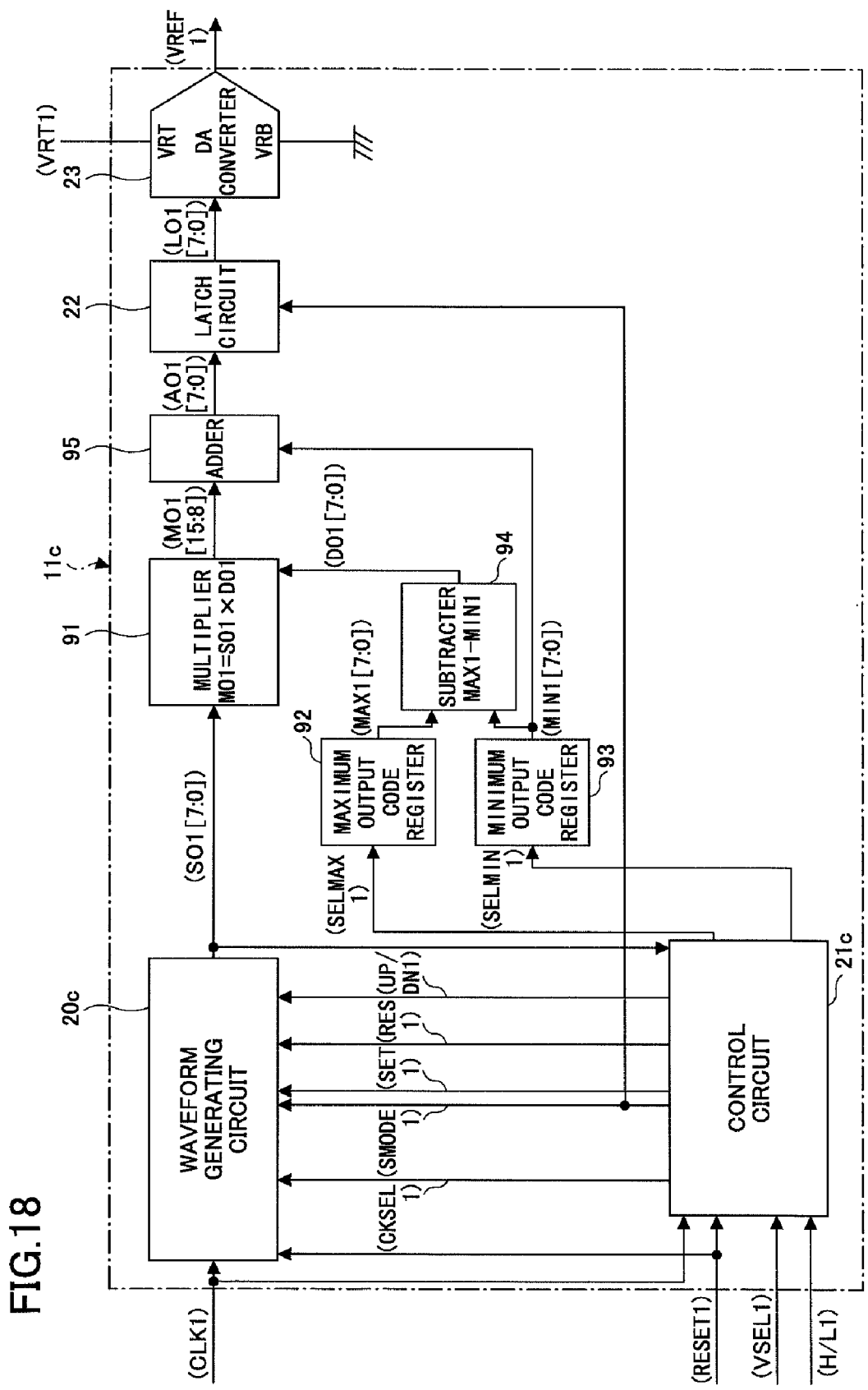
FIG. 18 is a block diagram illustrating a circuit configuration example of a switching power supply circuit according to a fourth embodiment of the invention.

FIG. 18 is a block diagram illustrating a circuit configuration example of a switching power supply circuit according to a fourth embodiment of the invention.

Note that a diagram illustrating the circuit configuration example of the switching power supply circuit according to the fourth embodiment is identical to that in FIG. 1 except that the reference numeral 11 given to the reference voltage generating circuit in FIG. 1 is 11c, and illustration thereof is thus omitted. In FIG. 18, components either identical or similar to those in FIG. 12 are given by the same reference numerals, and descriptions thereof are thus omitted. Only the configuration differing from that in FIG. 12 will be described below.

The configuration difference between FIG. 18 and FIG. 12 is as follows. In FIG. 18, the waveform generating circuit 20 and the control circuit 21b in FIG. 12 respectively correspond to a waveform generating circuit 20c and a control circuit 21c, and a minimum output code register 93, a subtracter 94 and an adder 95 are added thereto. The reference voltage generating circuit 11b in FIG. 12 corresponds to the reference voltage circuit 11c in FIG. 18.

In FIG. 18, the reference voltage generating circuit 11c includes the waveform generating circuit 20c, the control circuit 21c, the multiplier 91, the maximum output code register 92, the minimum output code register 93, the subtracter 94, the adder 95, the latch circuit 22, and the DA converter 23. Note that the waveform generating circuit 20c, the control circuit 21c, the minimum output code register 93, the subtracter 94, and the adder 95 respectively form a waveform generating circuit section, a control circuit section, a minimum output code storage section, a subtracter section, and an adder section.

The control circuit 21c outputs the control signal SMODE1 to the waveform generating circuit 20c and the latch circuit 22 based on the clock signal CLK1 output from the triangular waveform generating circuit 13 and the reset signal RESET1 output from the UVLO 10. The control circuit 21c outputs the maximum output code setting signal SELMAX1 to the maximum output code register 92 while simultaneously outputting the minimum output code setting signal SELMIN1 to the minimum output code register 93, based on the externally input signal VSEL1. Further, the control circuit 21c receives a signal H/L1 from outside, and controls to initiate operation, set, increment and decrement counts of the waveform generating circuit 20c.

The waveform generating circuit 20c, which is controlled by the clock signal CLK1 and the control circuit 21c, generates and outputs the waveform data SO1 [7:0]. The subtracter 94 subtracts the minimum output code MIN1 [7:0] output from the minimum output code register 93 from the maximum output code MAX1 [7:0] output from the maximum output code register 92, and generates and outputs a digital data DO1 [7:0]. The multiplier 91 multiplies the waveform data SO1 [7:0] output from the waveform generating circuit 20c by the digital data DO1 [7:0] input from the subtracter 94, and outputs the digital data MO1 [15:8] formed of the higher-order 8 bit data indicating the multiplied outcome.

The adder 95 adds the digital data MO1 [15:8] output from the multiplier 91 and the minimum output code MIN1 [7:0] output from the minimum output register 94, and generates and outputs an 8-bit digital data AO1 [7:0]. The latch circuit 22 outputs the input digital data AO1 [7:0] as the digital data LO1 [7:0] without any change while the control signal SMODE1 stays at the high level, and maintains the digital data AO1 [7:0] input when the control signal SMODE1 is switched to the low level and outputs the maintained digital data AO1 [7:0] as the digital data LO1 [7:0]. The digital data LO1 [7:0] output from the latch circuit 22 is converted from digital to analog data at the DA converter 23 and the converted data is output as the reference voltage VREF1. Note that in FIG. 18, the latch circuit 22 may be omitted such that the digital data AO1 [7:0] output from the adder 95 is directly input to the DA converter 23. In this case, the waveform generating circuit 20c is configured to maintain the waveform data SO1 [7:0] output when the control signal SMODE1 is switched to the low level, and output the maintained waveform data SO1 [7:0].

Figure 19:
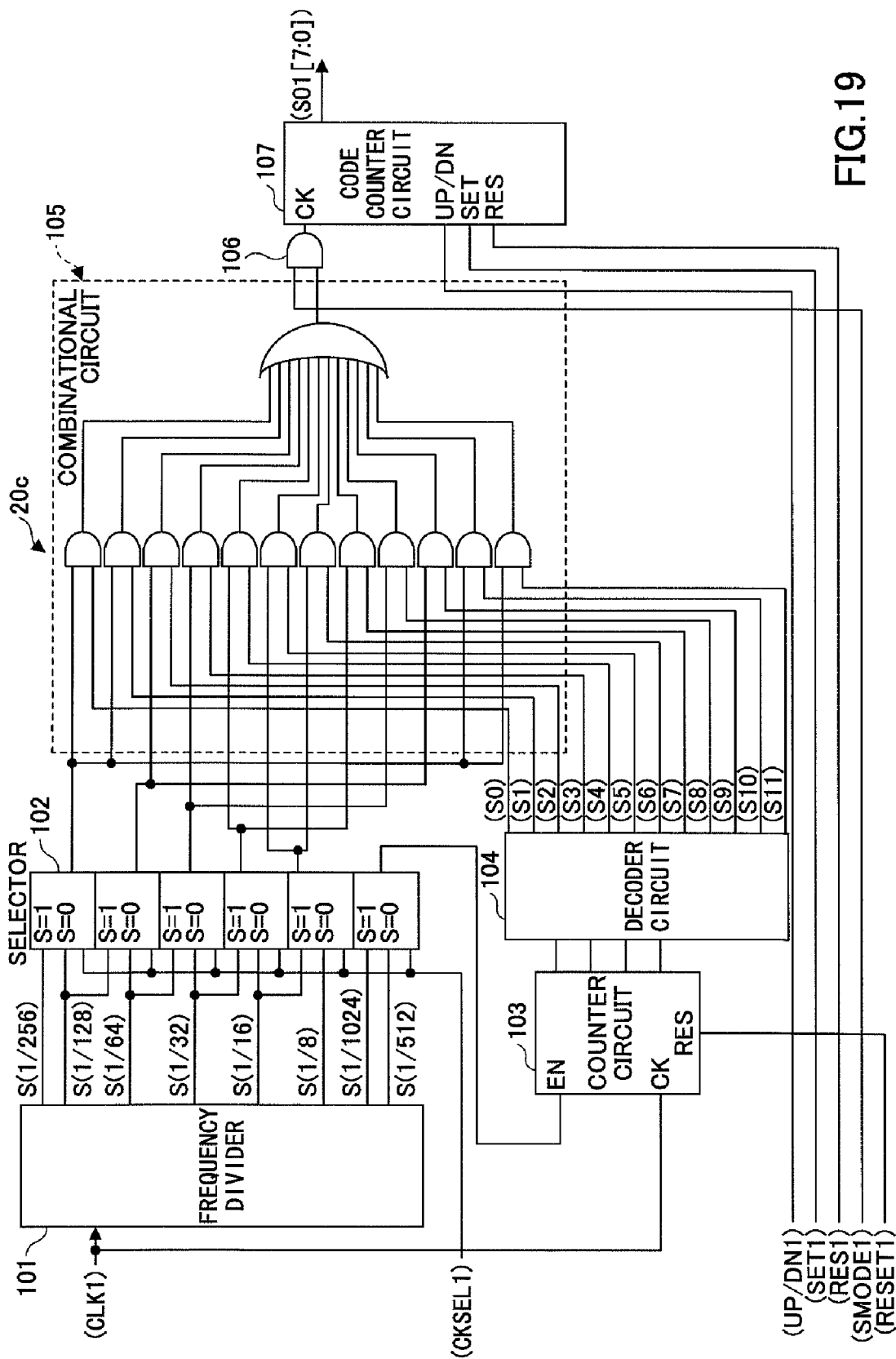
FIG. 19 is a diagram illustrating a circuit example of a waveform generating circuit 20c in FIG. 18.

FIG. 19 is a diagram illustrating a circuit example of a waveform generating circuit 20c in FIG. 18. In FIG. 19, the waveform generating circuit 20c includes a frequency divider 101 generating and outputting frequency divided clock signals S(1/8), S(1/16), S(1/32), S(1/64), S(1/128), S(1/256), S(1/512), and S(1/1024) obtained by dividing the frequency of the clock signal CLK1 by 8, 16, 32, 64, 128, 256, 512, and 1024, and a selector 102 selecting combinations between the frequency divided clock signals S(1/8), S(1/16), S(1/32), S(1/64), S(1/128), S(1/256), S(1/512), and S(1/1024) based on the signal CKSEL1 input from the control circuit 21c.

The waveform generating circuit 20c further includes a counter circuit 103 counting the number of clock pulses of the frequency divided clock signal S(1/512) or (1/1024) selected based on the signal CKSEL1, a decoder circuit 104 generates and outputs selection signals S0 to S11 for selecting the frequency divided signals output from the selector 102 based on the signal output from the counter circuit 103, a combinational circuit 104 combining the selection signals S0 to S11 output from the decoder circuit 104 with the frequency divided clock signals output from the selector 102 using AND circuits and an OR circuit, an AND circuit 106 outputting a signal output from the combinational circuit 105 provided that the control signal SMODE1 is at a high level, and a code counter circuit 107 counting the number of pulses of the signal output from the AND circuit 106, converting the signal into the 8-bit waveform data SO1 [7:0], and outputting the converted 8-bit waveform data.

Note that the counter circuit 101, the frequency divider 102, the decoder circuit 104, the combinational circuit 105 and the AND circuit 106, and the code counter circuit 107 respectively form a counter circuit section, a frequency dividing section, a selection circuit section, a combinational circuit section, and a code counter circuit section.

In the switching power supply circuit having this configuration, a rising edge of the reset signal RESET1 at the high level triggers the signal CKSEL1, a signal RES1, and an up-down signal UP/DN1 to switch to the high level. The selector 102 selects and outputs the frequency divided signal S(1/1024) when the signal CKSEL1 is at the high level, and selects and outputs the frequency divided signal S(1/512) when the signal CKSEL1 is at the low level. The code counter circuit 107 is reset when the signal RES1 is at the high level. The code counter circuit 107 increments counts when the up-down signal UP/DN1 is at the high level and decrements counts when the up-down signal UP/DN1 is at the low level.

The control circuit 21c switches the control signal SMODE1 to the high level when the reset signal RES1 is switched to the low level, thereby initiating soft-starting operation and operation of the waveform generating circuit 21c. The counter circuit 103 counts the clock signal CLK1 to increment by one count for every 1024 clocks and outputs 4-bit digital data indicating the counted value to the decoder circuit 104. The decoder circuit 104 outputs the signal indicating 12 intervals of the selection signals S0 to S11 based on the digital data input from the counter 103, and count cycles for the corresponding intervals are determined based on the frequency divided clock signals output from the selector 102.

Specifically, the code counter circuit 107 increments by one count: by 1/256 cycle when the selection signal S0 is switched to the high level; by 1/256 cycle when the selection signal S1 is switched to the high level; by 1/128 cycle when the selection signal S2 is switched to the high level; by 1/64 cycle when the selection signal S3 is switched to the high level; by 1/32 cycle when the selection signal S4 is switched to the high level; by 1/16 cycle when the selection signal S5 is switched to the high level; by 1/16 cycle when the selection signal S6 is switched to the high level; by 1/32 cycle when the selection signal S7 is switched to the high level; by 1/64 cycle when the selection signal S8 is switched to the high level; by 1/128 cycle when the selection signal S9 is switched to the high level; by 1/256 cycle when the selection signal S10 is switched to the high level; and by 1/256 cycle when the selection signal S11 is switched to the high level.

FIG. 20 includes graphs (a) to (d) each illustrating an operational example of the reference voltage generating circuit 11c when the signal VSEL1 is at the high level.

The code counter circuit 107 performs count-up operation when the up-down signal UP/DN1 is switched to the high level, and outputs 8-bit waveform data SO1 [7:0] indicating the counted value as shown in FIG. 20(a). The maximum output code of the maximum output code register 92 is set at 200 and the minimum output code of the minimum output coed register 93 is set at 100 when the signal VSEL1 output from the control circuit 21c is switched to the high level. The maximum output code of the maximum output code register 92 is set at 200 and the minimum output code of the minimum output coed register 93 is set at 100 when the signal VSEL1 output from the control circuit 21c is switched to the low level. Note that the minimum output code of the minimum code register 93 is set at 0 during the soft-starting operation, regardless of the levels of the signal VSEL1.

The maximum output code MAX1 [7:0] indicates 200 when the signal VSEL1 is at the high level, and the minimum output code MIN1 [7:0] indicates 0 during the soft-starting operation. The subtracter 94 subtracts the minimum output code MIN1 [7:0] from the maximum output code MAX1 [7:0], and the digital data DO1 [7:0] output from the subtracter 94 indicates 200. The multiplier 91 multiplies the waveform data SO1 [7:0] output from the waveform generating circuit 20c by the digital data DO1 [7:0] indicating 200 output from the subtracter 94, thereby obtaining 16-bit digital data MO1 [15:0] as shown in FIG. 20(b).

The higher-order 8-bit data of the obtained digital data MO1 [15:0], that is, the digital data MO1 [15:8] in FIG. 20(c), is output. The adder 95 adds the digital data MO1 [15:8] output from the multiplier 91 and the minimum output code MIN1 [7:0] output from the minimum output register 93, and outputs the digital data AO1 [7:0] as shown in FIG. 20(d). The latch circuit 22 outputs the digital data AO1 [7:0] as the digital data LO1 [7:0] without any change while the control signal SMODE1 stays at the high level. By contrast, the latch circuit 22 maintains the digital data AO1 [7:0] input when the control signal SMODE1 is switched to the low level and outputs the maintained digital data AO1 [7:0] as the digital data LO1 [7:0]. The digital data LO1 [7:0] is converted from digital to analog data at the DA converter 23 and the converted data is output as the reference voltage VREF1.

When the waveform data SO1 [7:0] output from the waveform generating circuit 20c indicates 255, the control circuit 21c switches the control signal SMODE1 to the low level and terminates the soft-starting operation. When the soft-starting operation is terminated, the signal CKSEK1 is switched to the low level, and the selector 102 switches the frequency divided clock signal input to the counter circuit 103 from the frequency divided signal S(1/1024) to the frequency divided signal S(1/512). The selector 102 also switches the frequency divided clock signal input to the combinational circuit 105.

Specifically, the code counter circuit 107 increments by one count: by 1/128 cycle when the selection signal S0 is switched to the high level; by 1/128 cycle when the selection signal S1 is switched to the high level; by 1/64 cycle when the selection signal S2 is switched to the high level; by 1/32 cycle when the selection signal S3 is switched to the high level; by 1/16 cycle when the selection signal S4 is switched to the high level; by 1/8 cycle when the selection signal S5 is switched to the high level; by 1/8 cycle when the selection signal S6 is switched to the high level; by 1/16 cycle when the selection signal S7 is switched to the high level; by 1/32 cycle when the selection signal S8 is switched to the high level; by 1/64 cycle when the selection signal S9 is switched to the high level; by 1/128 cycle when the selection signal S10 is switched to the high level; and by 1/128 cycle when the selection signal S11 is switched to the high level.

When the minimum output code MIN1 [7:0] is switched to 100, the digital data DO1 [7:0] output from the subtracter 94 is switched to 100, the digital data MO1 [15:0] obtained at the multiplier 91 is switched from 51000 to 25500, and the digital data MO1 [15:8] is switched from 200 to 100. The minimum output code MIN1 [7:0] indicating 100 is added to the digital data MO1 [15:8] indicating 100 to give 200 to the digital data AO1 [7:0] output from the adder 95, which is an equivalent value after soft-starting operation. By contrast, the latch circuit 22 maintains the digital data AO1 [7:0] input when the control signal SMODE1 is at the low level and outputs the maintained digital data AO1 [7:0] without any change, and the digital data LO1 [7:0] thus remains unchanged. With the aforementioned operation, after initiating the soft-starting operation, the digital data LO1 [7:0] gradually rises up from 0 to 200 as shown in FIG. 20(d).

FIG. 21 includes graphs (a) to (d) each illustrating another operational example of the reference voltage generating circuit 11c when the signal VSEL1 is at the high level, and the output voltage Vout1 is changed after the soft-starting operation has finished. The control circuit 21c switches a signal SET1 to the high level, the up-down signal UP/DN1 to the low level, and the control signal SMODE1 to the high level when the signal H/L1 from outside is switched from the high level to low level.

The code counter circuit 107 changes the waveform data SO1 [7:0] to 255 as shown in FIG. 21(a) when the signal SET1 is switched to the high level, and starts decrementing counts based on the signal input from AND circuit 106 when the up-down signal UP/DN1 is switched to the low level. The code counter circuit 107 decrements counts until the waveform data SO1 [7:0] indicates 0, and the control circuit 21c switches the control signal SMODE1 to the low level when the waveform data SO1 [7:0] indicates 0.

The multiplier 91, the maximum output code register 92, the minimum output code register 93, the subtracter 91, the adder 95, the latch circuit 22 and the DA converter 23 each operate in a similar manner as their operation during the soft starting operation. Accordingly, the digital data LO1 [7:0] input to the DA converter 23 exhibits a gradual change from 200 to 100 in the same manner as the digital data AO1 [7:0] as shown in FIG. 21(d).

FIG. 22 includes graphs (a) to (d) each illustrating another operational example of the reference voltage generating circuit 11c when the signal HL1 is switched from the low level to the high level while the signal VSEL1 stays at the high level.

The control circuit 21c switches the signal RES1, the up-down signal UP/DN1, and the control signal SMODE1 to the high level when the signal H/L1 is switched from the low level to the high level. The code counter circuit 107 changes the waveform data SO1 [7:0] to 0 as shown in FIG. 22(a) when the signal RES1 is switched to the high level, and starts incrementing counts based on the signal input from the AND circuit 106 when the up-down signal UP/DN1 is switched to the high level. The code counter circuit 107 increments counts until the waveform data SO1 [7:0] indicates 255, and the control circuit 21c switches the control signal SMODE1 to the low level when the waveform data SO1 [7:0] indicates 255.

The multiplier 91, the maximum output code register 92, the minimum output code register 93, the subtracter 91, the adder 95, the latch circuit 22 and the DA converter 23 each operate in a similar manner as their operation during the soft-starting operation.

Accordingly, the digital data LO1 [7:0] input to the DA converter 23 exhibits a gradual change from 100 to 200 in the same manner as the digital data AO1 [7:0] as shown in FIG. 21(d).

Note that the circuit configurations shown in FIGS. 18 and 19 are only one example, and the maximum output code of the maximum output code register 92 and the minimum output code of the minimum output code register 93, and frequency dividing ratio of the frequency divider 101 may optionally be set.

Figure 23:
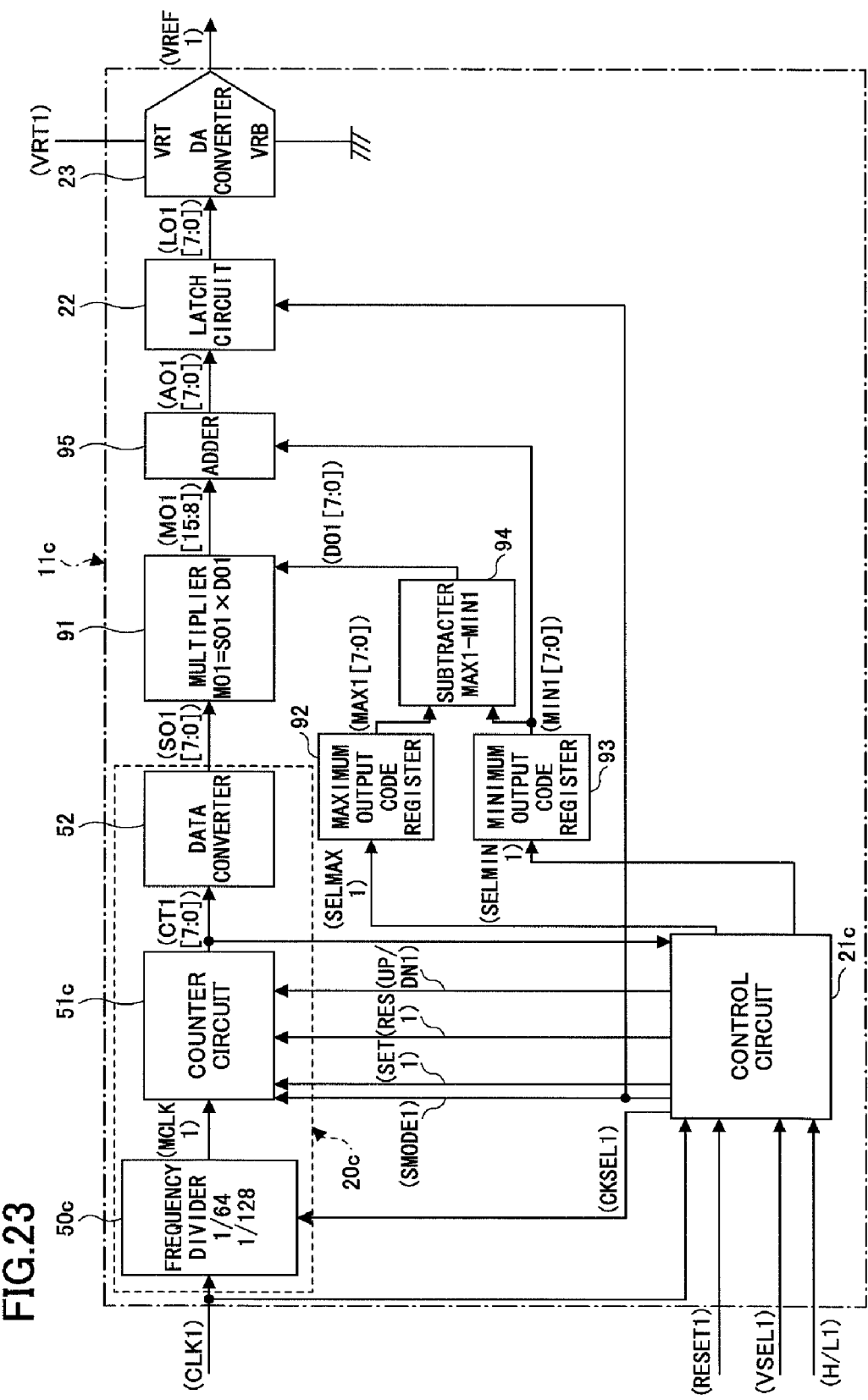
FIG. 23 is a block diagram illustrating a circuit configuration example of a switching power supply circuit according to a fourth embodiment of the invention.

FIG. 18 only illustrates an example where the minimum output code register 93, the subtracter 94, and the adder 95 are provided in the circuit configuration of FIG. 12; however, the example may also be configured such that the minimum output code register 93, the subtracter 94, and the adder 95 may be provided in the circuit configuration of FIG. 15, as shown in FIG. 23. In FIG. 23, components either identical or similar to those in FIG. 18 are given by the same reference numerals, and descriptions thereof are thus omitted. Only the configuration differing from that in FIG. 18 will be described below.

In FIG. 23, the reference voltage generating circuit 11c includes the waveform generating circuit 20c, the control circuit 21c, the multiplier 91, the maximum output code register 92, the minimum output code register 93, the subtracter 94, the adder 95, the latch circuit 22, and the DA converter 23. The waveform generating circuit 20c includes the frequency divider 50c dividing the frequency of the clock signal CLK, the counter circuit 51c counting the number of pulses of divided clock signal MCLK1 output from the frequency divider 50c and outputting count data CT1 [7:0] indicating the counted value, and the data converter 52 converting the count data CT1 [7:0] output from the counter circuit 51c into the waveform data SO1 [7:0] by a predetermined method and outputting the converted data. Note that the frequency divider 50c and the counter circuit 51c respectively form the frequency divider section and the counter circuit section.

The control circuit 21c outputs the control signal SMODE1 to the counter circuit 51c and the latch circuit 22 based on the clock signal CLK1 output from the triangular waveform generating circuit 13 and the reset signal RESET1 output from the UVLO 10. The control circuit 21c that receives the signal H/L1 from outside controls the frequency divider 50c to obtain the frequency dividing ratio, the initiation of operation, setting, resetting, and count up and count down for the counter circuit 51c. The frequency divider 50c divides the input clock signal CLK1 by any one of the frequency dividing ratios 1/64 and 1/128 based on the signal CKSEL1 input from the control circuit 21c, and outputs the frequency divided signal as the frequency divided signal MCLK1. The counter circuit 51c counts the number of pulses of the frequency divided clock signal MCLK1 output from the frequency divider 50c and outputs the count data CT1 [7:0] indicating the counted value. The data converter 52 converts the count data CT1 [7:0] output from the counter circuit 51c into waveform data SO1 [7:0] and outputs the converted data to the multiplier 91.

Figure 24B:
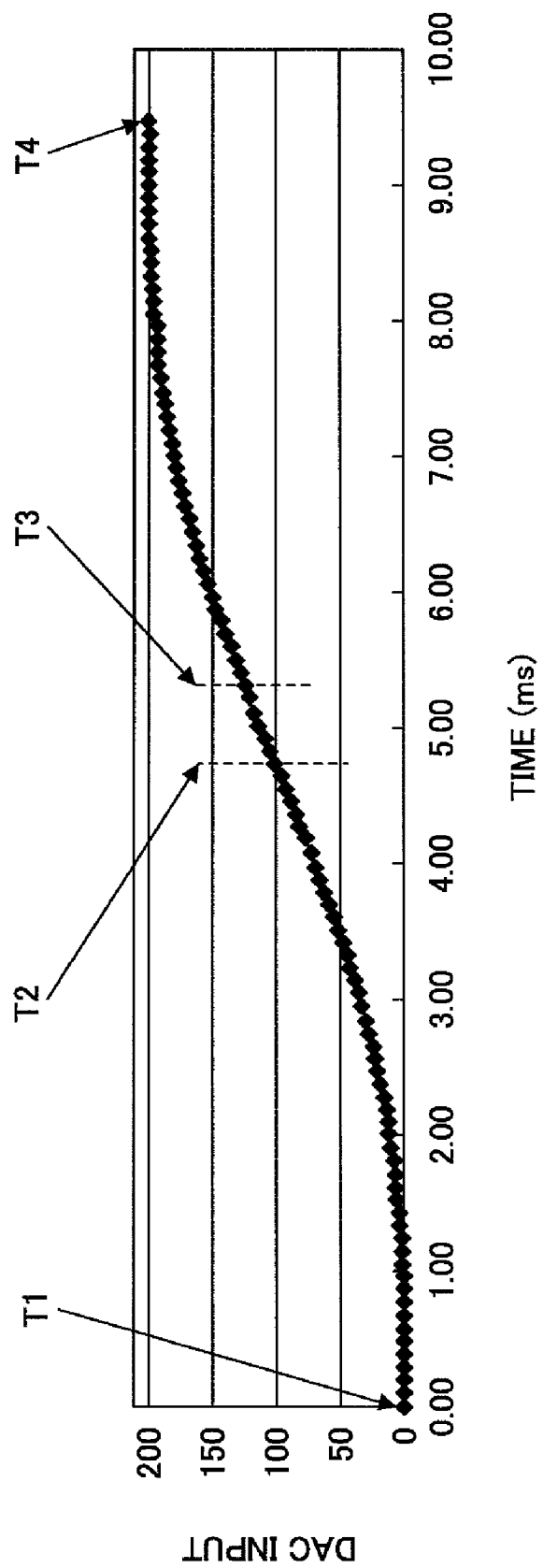

In the switching power supply circuit having this configuration, FIGS. 24A, 24B are timing charts illustrating an operational example of the reference voltage generating circuit 11c in FIG. 23, specifically illustrating an example of the soft-starting operation when the signal VSEL1 is at the high level.

In FIGS. 24A, 24B, a rising edge of the reset signal RESET1 at the high level triggers the signal CKSEL1, a signal RES1, and an up-down signal UP/DN1 to switch to the high level. The frequency divider 50c divides the frequency of the input clock signal CKSEL1 by the frequency dividing ratio of 1/128 when the signal CKSEL is at the high level and divides the frequency of the input clock signal CKSEL1 by the frequency dividing ratio of 1/64 when the signal CKSEL is at the low level. The counter circuit 51c is reset when the signal RES1 is switched to the high level. The counter circuit 51c increments counts when the up-down signal UP/DN1 is switched to the high level whereas the counter circuit 51c decrements counts when the up-down signal UP/DN1 is switched to the low level.

The control circuit 21c switches the control signal SMODE1 to the high level and initiates the soft-starting operation when the reset signal RESET1 is switched to the low level, and then causes the counter circuit 51c to initiate incrementing counts based on the frequency divided clock signal MCLK1 obtained by dividing the frequency of the clock signal CLK1 by 128 at the frequency divider 50c. The count data CT1 [7:0] output from the counter circuit 51c is input to the data converter 52, which generates the waveform data SO1 [7:0] in a similar manner as illustrated in FIG. 8 and outputs the converted data to the multiplier 91.

When the count data CT1 [7:0] output from the counter circuit 51c indicates 100, the control circuit 21c switches the control signal SMODE1 and the signal CKSEL1 to the low level, thereby terminating the soft-starting operation. When the signal CKSEL1 is switched to the low level, the frequency divider 50c divides the frequency of the clock signal CLK1 by the frequency dividing ratio of 1/64 and outputs the frequency divided signal as the frequency divided clock signal MCLK1. Other operations are the same as those described in FIG. 18 and the descriptions thereof are thus omitted.

Figure 25B:
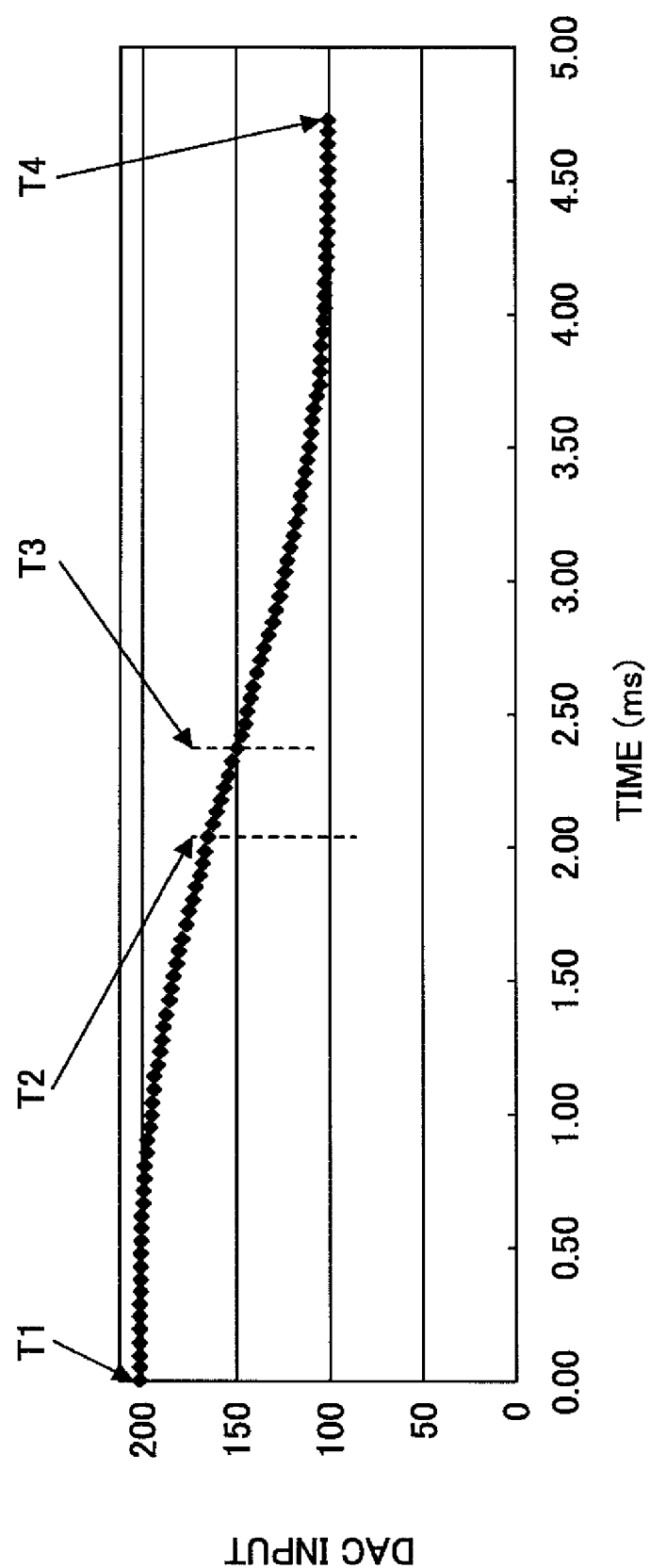

FIGS. 25A, 25B are timing charts illustrating another operational example of the reference voltage generating circuit 11c when the signal VSEL1 is at the high level and the output voltage Vout1 is changed after the soft-starting operation has finished.

The control circuit 21c switches the signal SET1 to the high level, the up-down signal UP/DN1 to the low level, and the control signal SMODE1 to the high level when the signal H/L1 is switched from the high level to low level. The counter circuit 51c sets the count data CT1 [7:0] to 100 when the signal SET1 is switched to the high level, starts counting of the frequency divided signal MCLK1 obtained by dividing the frequency of the clock signal CLK1 by 64 at the frequency divider 50c when the control signal SMODE1 is switched to the high level, and decrements counts when the up-down signal UP/DN1 is switched to the low level.

The counter circuit 51c decrements counts until the count data CT1 [7:0] indicates 0, and the control circuit 21c switches the control signal SMODE1 to the low level when the count data CT1 [7:0] indicates 0. Other operations are the same as those in the soft-starting operation, whereby the digital data LO1 [7:0] input to the DA converter 23 exhibits a gradual change from 200 to 100 as shown in FIGS. 25A, 25B.

Figure 26A:
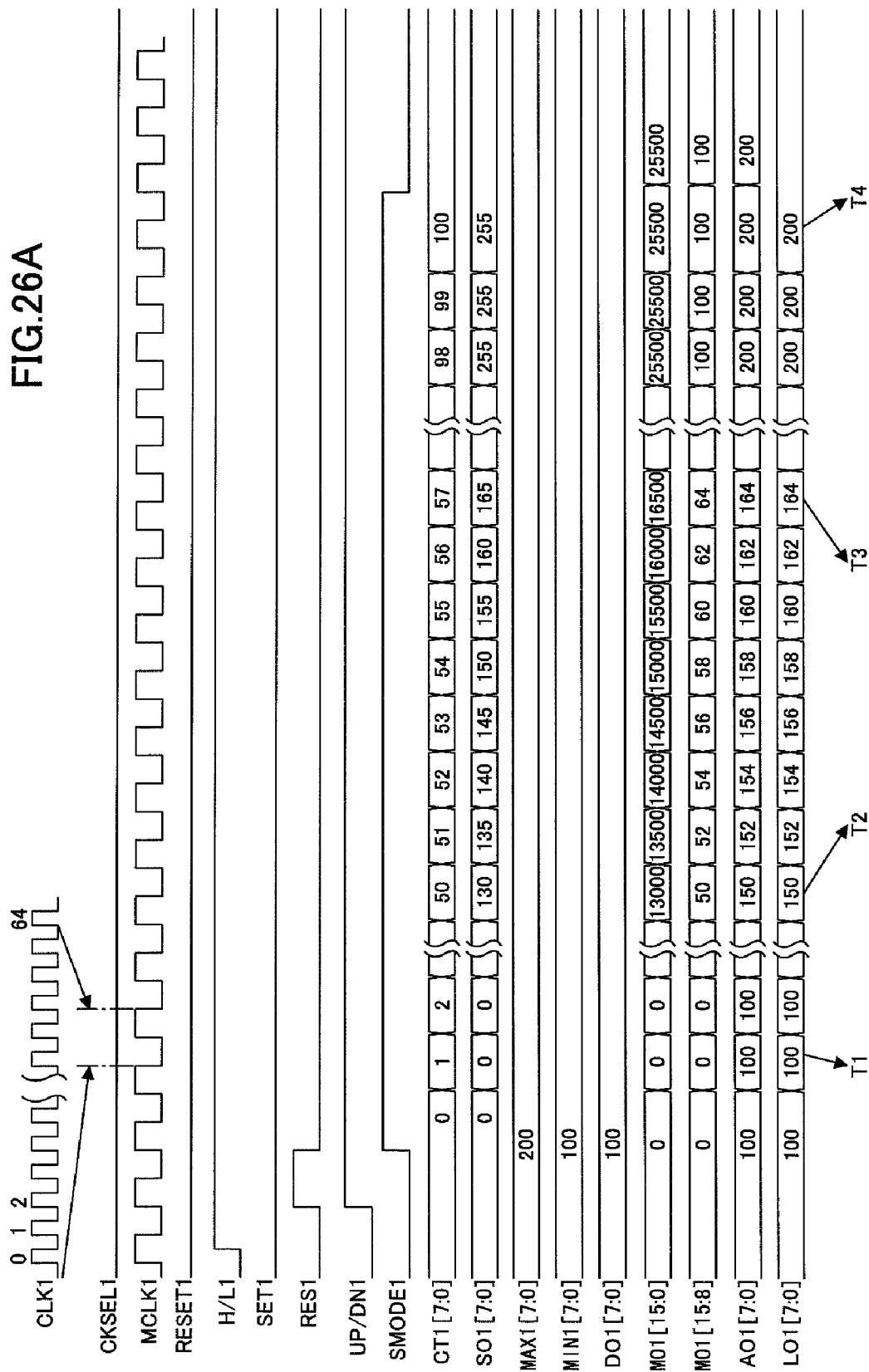
FIGS. 26A, 26B are timing charts illustrating another operational example of the reference voltage generating circuit 11c in FIG. 23.
Figure 26B:
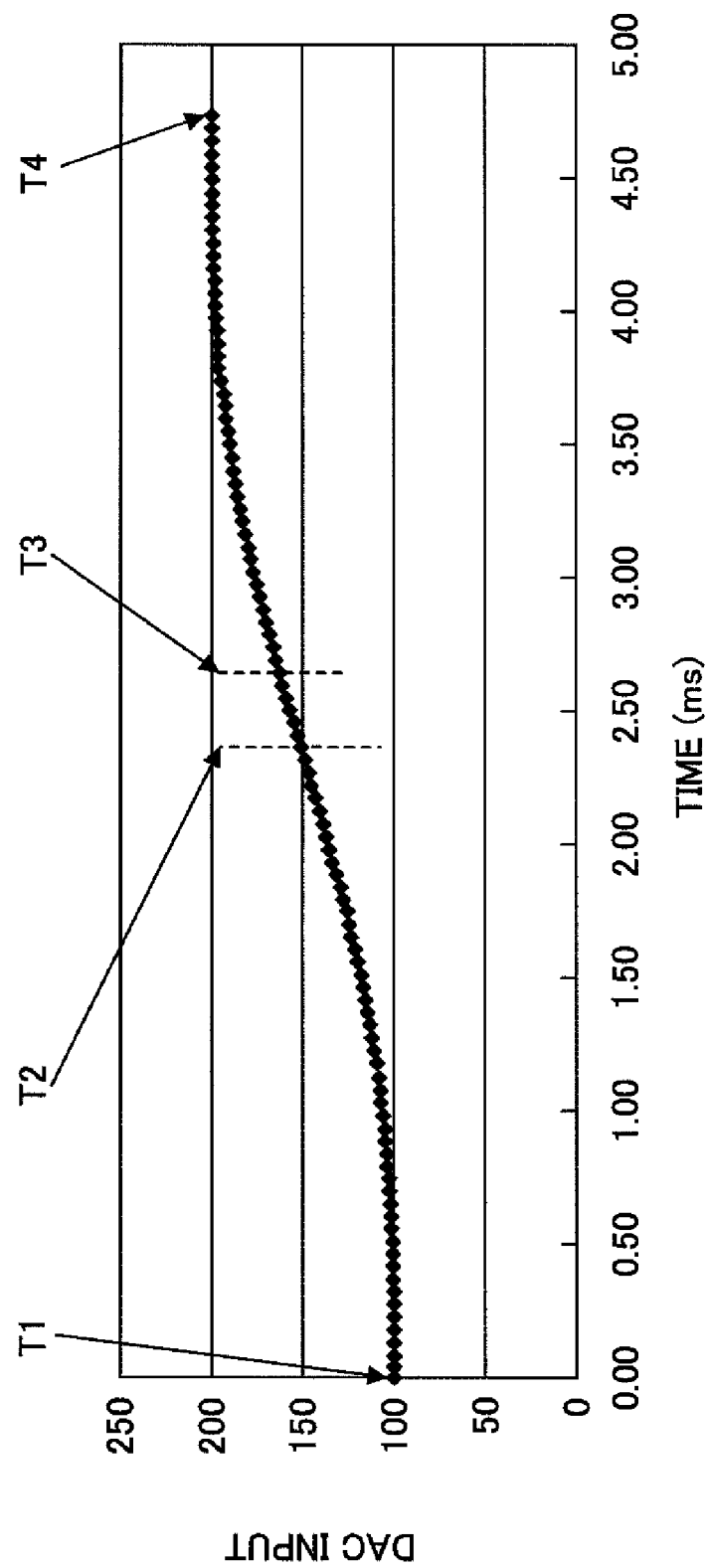
Figure 27:
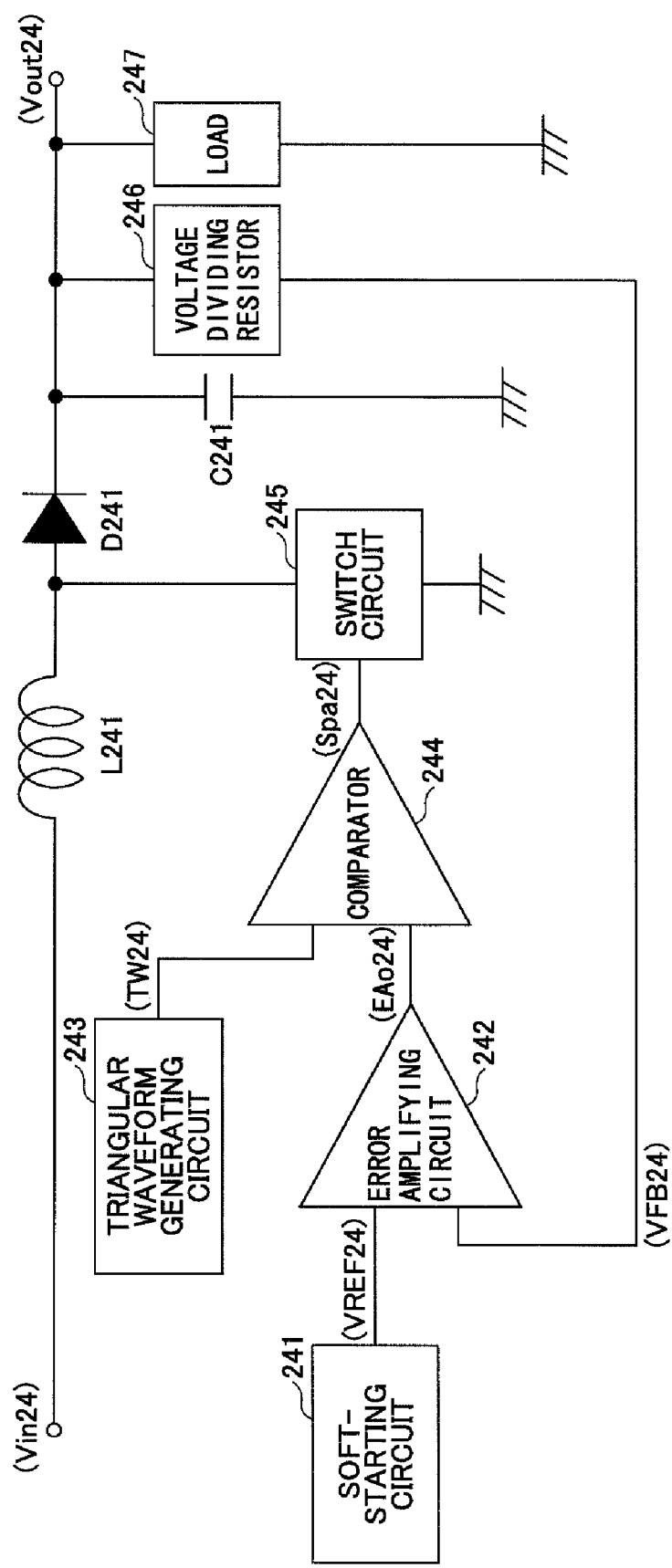
FIG. 27 is an example of a switching power supply circuit according to a related art.
Figure 28:
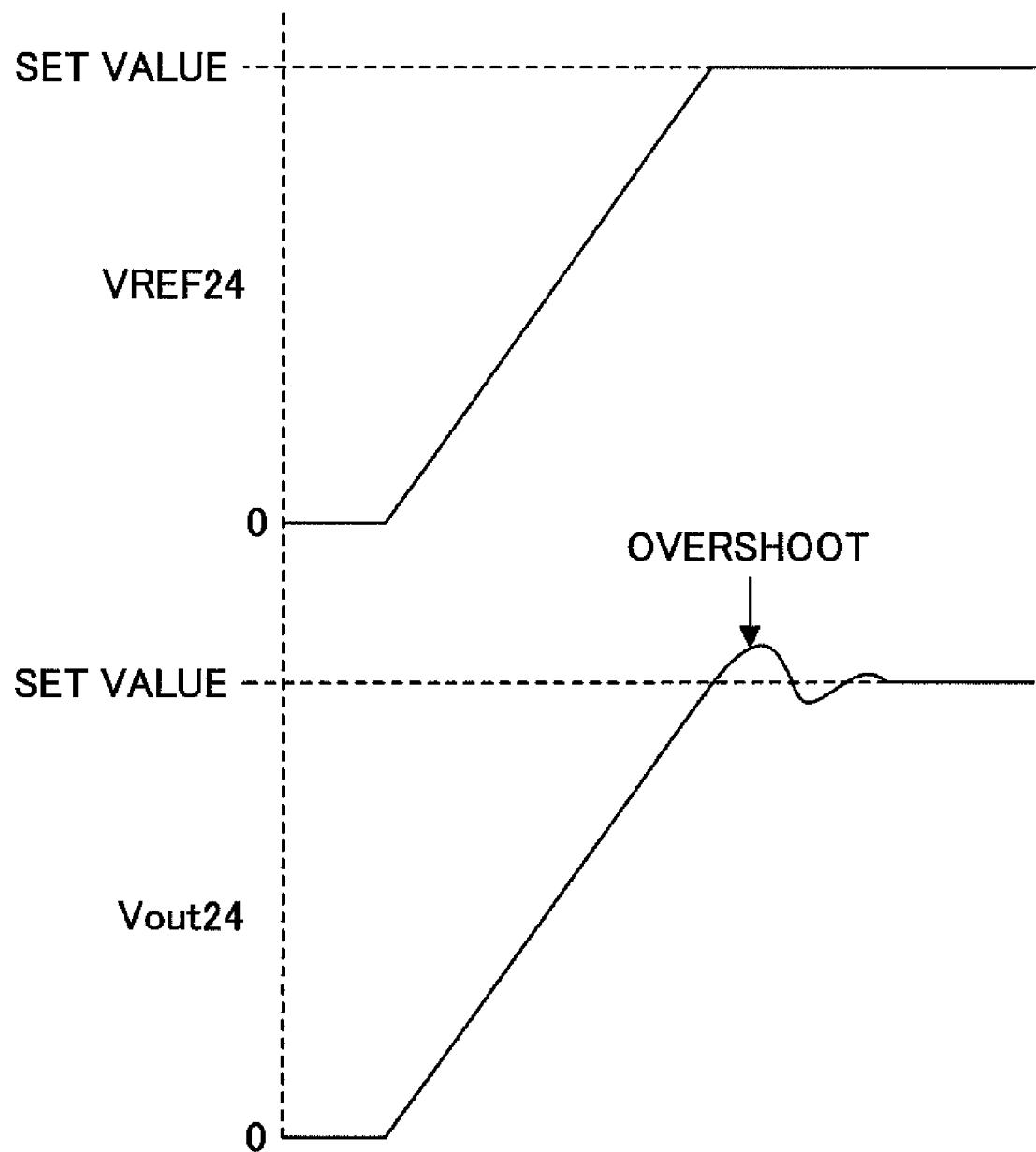
FIG. 28 is a diagram illustrating examples of reference voltage VREF and output voltage Vout24.
Figure 29:
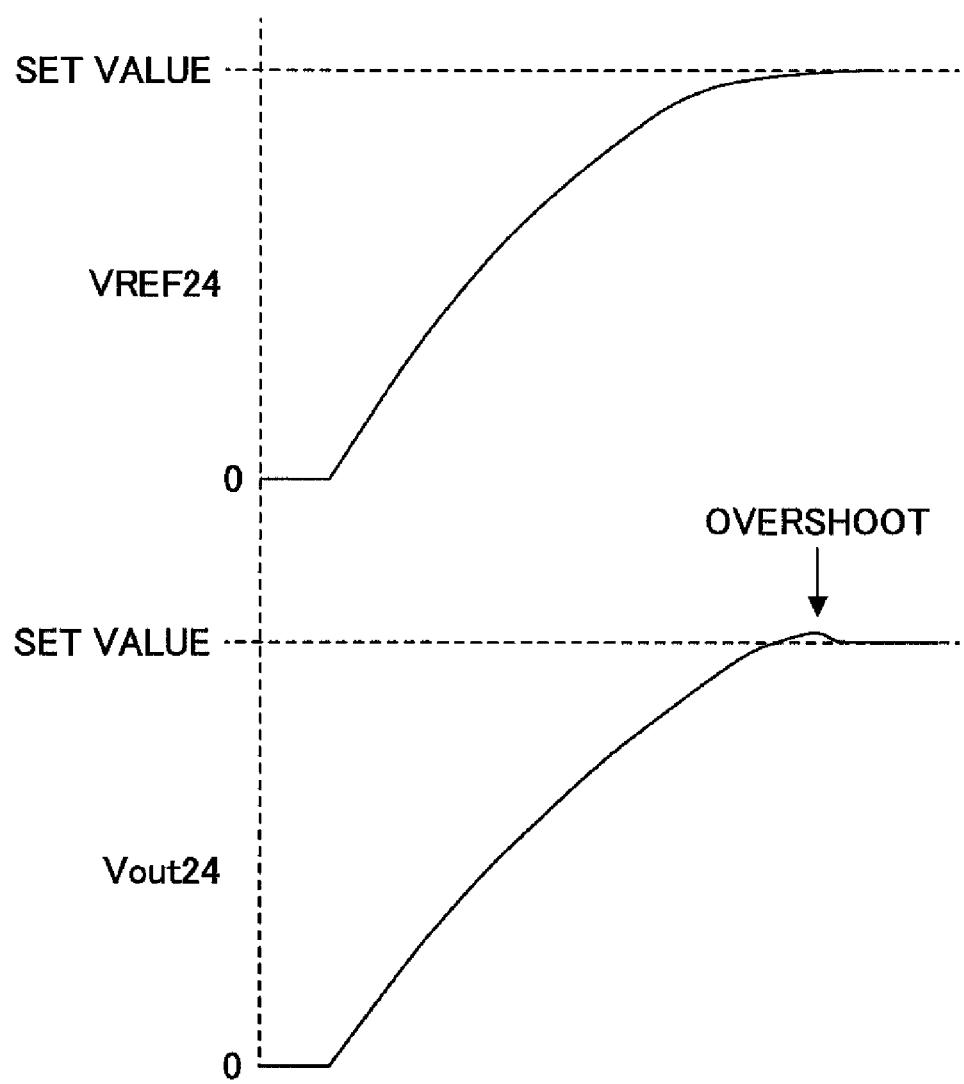
FIG. 29 is a diagram illustrating other examples of reference voltage VREF and output voltage Vout24.
Figure 30:
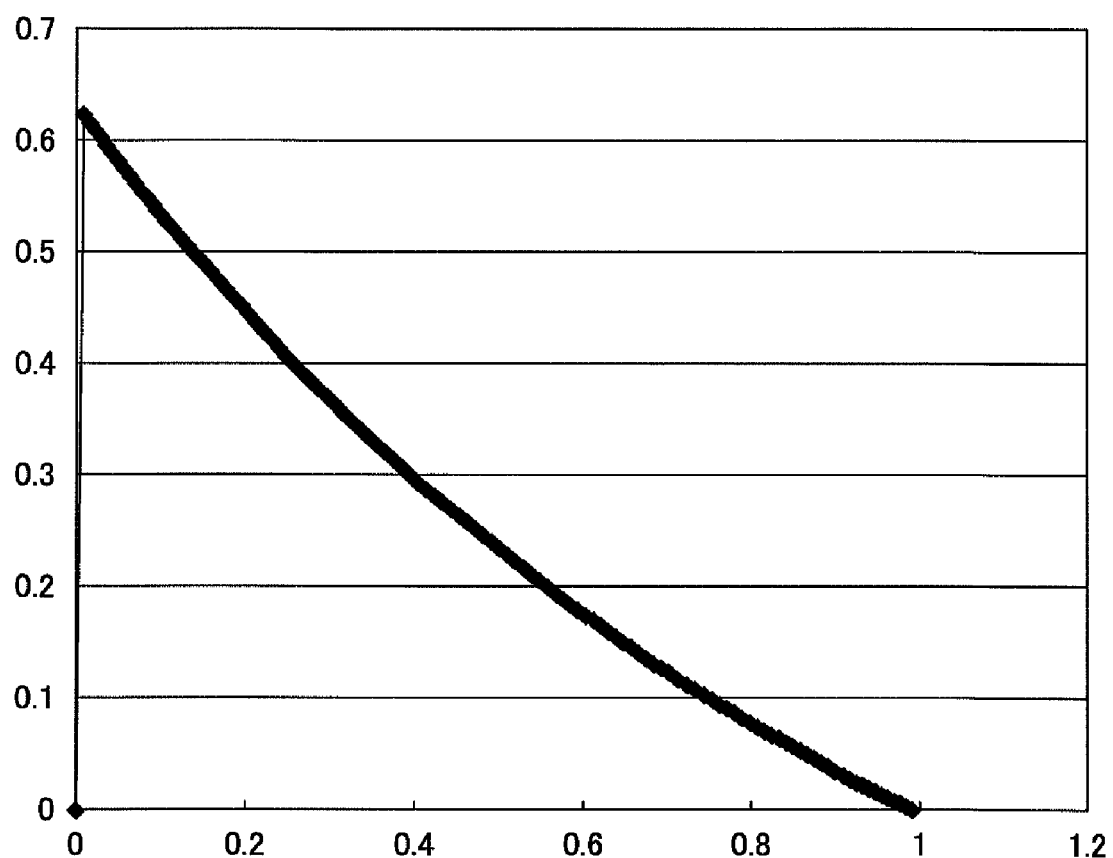
FIG. 30 is a graph illustrating inrush current flowing into a capacitor C241 in FIG. 27.

FIGS. 26A, 26B are timing charts illustrating another operational example of the reference voltage generating circuit 11c when the signal H/L1 is switched from the low level to the high level while the signal VSEL1 stays at the high level.

The control circuit 21c switches the signal RES1, the up-down signal UP/DN1, and the control signal SMODE1 to the high level when the signal H/L1 is switched from the low level to the high level. The counter circuit 51c resets the count data CT1 [7:0] to 0 when the signal SET1 is switched to the high level, starts counting of the frequency divided signal MCLK1 obtained by dividing the frequency of the clock signal CLK1 by 64 at the frequency divider 50c when the control signal SMODE1 is switched to the high level, and increments counts as the up-down signal UP/DN1 is at the high level.

The counter circuit 51c increments counts until the count data CT1 [7:0] indicates 100, and the control circuit 21c switches the control signal SMODE1 to the low level when the count data CT1 [7:0] indicates 100. Other operations are the same as those in the soft-starting operation, whereby the digital data LO1 [7:0] input to the DA converter 23 exhibits a gradual change from 100 to 200 as shown in FIGS. 26A, 26B.

Note that the circuit configuration shown in FIG. 23 is only one example, and the maximum output code of the maximum output code register 92 and the minimum output code of the minimum output code register 93, and frequency dividing ratio of the frequency divider 50c may optionally be set.

Thus, since the switching power supply circuit according to the fourth embodiment can provide the same effect as that of the third embodiment, and can use the same waveform generating circuit at the rise-up of the output voltage in a case the set value of the output voltage Vout1 is changed after the output voltage Vout1 has risen to the set value, the overshoot and undershoot may be reduced when the output voltage is changed. As a result, the number of circuits employed in the switch circuit can be reduced. Further, since the maximum output code, minimum output code, and frequency dividing ratio can optionally be changed, the switching power supply circuit according to the fourth embodiment can easily be applied to other circuits. In addition, in the switching power supply circuit according to the fourth embodiment, noises caused when changing the output voltage can be reduced to the minimum while quickly changing the output voltage.

In the switching power supply circuit according to the embodiments of the invention, since the reference voltage generating circuit is configured such that during an initial start-up period in which the reference voltage rises from zero voltage to a predetermined voltage, a voltage rise rate of the reference voltage within a first predetermined period from a start point of the initial start-up period and a voltage rise rate of the reference voltage within a second predetermined period immediately preceding an end point of the initial start-up period are smaller than a voltage rise rate of the reference voltage in a period between the first predetermined period and the second predetermined period. As a result, a gradual rise-up of the output voltage can be achieved so that overshooting output voltage can be reduced while the noises occurred during the soft-starting operation can be reduced.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

This patent application is based on Japanese Priority Patent Application No. 2008-185954 filed on Jul. 17, 2008, the entire contents of which are hereby incorporated herein by reference.

What is claimed is:

1. A switching power supply circuit for generating an output voltage at an output node based on an input voltage at an input node, comprising:

a reference voltage generating circuit configured to generate a reference voltage such that during an initial start-up period in which the reference voltage rises from zero voltage to a predetermined voltage a voltage rise rate of the reference voltage within a first predetermined period from a start point of the initial start-up period and a voltage rise rate of the reference voltage within a second predetermined period immediately preceding an end point of the initial start-up period are smaller than a voltage rise rate of the reference voltage in a period between the first predetermined period and the second predetermined period;

a coil disposed between the input node and the output node; and a switch circuit configured to switch on and off to control a current running through the coil in response to comparison between the reference voltage and a voltage proportional to the output voltage.

2. The switching power supply circuit as claimed in claim 1, wherein during the initial start-up period, the reference voltage generating circuit raises the reference voltage such that the voltage rise waveform forms a sine wave.

3. The switching power supply circuit as claimed in claim 1, wherein the reference voltage generating circuit includes:

a waveform generating circuit section configured to generate and output waveform data formed of digital data that changes over time to form a waveform analogous to the waveform of the reference voltage from a predetermined clock signal when a predetermined control signal is input;

a DA converter section configured to convert the waveform data output from the waveform generating circuit section from digital to analog data to generate the reference voltage; and a control circuit section configured to output the predetermined control signal to the waveform generating circuit section when a predetermined signal is input from outside, and wherein the control circuit section terminates outputting the predetermined control signal when the waveform data output from the waveform generating circuit section indicates a predetermined data.

4. The switching power supply circuit as claimed in claim 1, wherein the reference voltage generating circuit includes:

a waveform generating circuit section configured to generate and output waveform data formed of digital data that changes over time to form a waveform analogous to the waveform of the reference voltage from a predetermined clock signal when a predetermined control signal is input;

a maximum output code storage section configured to store a plurality of different maximum output codes and output the maximum output codes selected based on an input signal;

a multiplier section configured to multiply the waveform data output from the waveform generating circuit section by the maximum output codes output from the maximum output code storage section;

a DA converter section configured to convert data output from the multiplier section to generate the reference voltage; and a control circuit section configured to output the predetermined control signal when a predetermined signal is input from outside, and output the maximum output codes based on the signal input from outside, and wherein the control circuit section terminates outputting the predetermined control signal when the waveform data output from the waveform generating circuit section indicates a predetermined data.

5. The switching power supply circuit as claimed in claim 1, wherein the reference voltage generating circuit includes:

a waveform generating circuit section configured to generate and output waveform data formed of digital data that changes over time to form a waveform analogous to the waveform of the reference voltage from a predetermined clock signal when a predetermined control signal is input;

a maximum output code storage section configured to store a plurality of different maximum output codes and output the maximum output codes selected based on an input signal;

a minimum output code storage section configured to store a plurality of different minimum output codes and output the minimum output codes selected based on an input signal;

a subtracter section configured to subtract the minimum output codes output from the minimum output code storage section from the maximum output codes output from the maximum output code storage section;

a multiplier section configured to multiply the waveform data output from the waveform generating circuit section by data output from the maximum output code storage section;

an adder section configured to add the minimum output codes output from the minimum output code storage section to data output from the multiplier section;

a DA converter section configured to convert data output from the multiplier section from digital data to analog data to generate the reference voltage; and a control circuit section configured to output the predetermined control signal when a predetermined signal is input from outside, and output the maximum output codes and the minimum output codes based on the signals input from outside, and wherein the control circuit section terminates outputting the predetermined control signal when the waveform data output from the waveform generating circuit section indicates a predetermined data.

6. The switching power supply circuit as claimed in claim 3, wherein the waveform generating circuit includes:

a frequency divider section configured to divide a frequency of the clock signal by a plurality of predetermined frequency dividing ratios to generate predetermined frequency divided clock signals;

a counter circuit section configured to count the number of clock pulses of the clock signal by a predetermined cycle, and output data indicating the counted value;

a selector section configured to generate and output a selection signal for selecting any one of the frequency divided clock signals based on data output from the counter circuit section;

a combinational circuit section configured to select any one of the frequency divided clock signals output from the frequency divider section based on the selection signal output from the selector circuit section, and output the selected frequency divided clock signal when a predetermined control signal is input from the control circuit section; and a code counter circuit section configured to count the number of clock pulses of the frequency divided clock signal output from the combinational circuit section, and output data indicating the counted value as the waveform data, and wherein the control circuit section terminates outputting the predetermined control signal when the waveform data output from the code counter circuit section indicates the predetermined data.

7. The switching power supply circuit as claimed in claim 3, wherein the waveform generating circuit includes:

a frequency divider section configured to divide a frequency of the clock signal by a predetermined frequency dividing ratio to output the signal as a frequency divided signal;

a counter circuit section configured to count the number of clock pulses of the frequency divided signal output from the frequency divider section when the predetermined control signal is input from the control circuit section; and a data converter section configured to convert data output from the counter circuit section according to a predetermined method and output the converted data as the waveform data, and wherein the control circuit section terminates outputting the predetermined control signal when the data output from the counter circuit section indicates a predetermined data.

8. The switching power supply circuit as claimed in claim 5, wherein the waveform generating circuit includes:

a frequency divider section configured to divide a frequency of the clock signal by a first combination of predetermined frequency dividing ratios or a second combination of predetermined frequency dividing ratios based on a selection signal output from the control circuit section;

a counter circuit section configured to count the number of clock pulses of the clock signal by a predetermined cycle, and output data indicating the counted value;

a selector section configured to generate and output a selection signal for selecting any one of the frequency divided clock signals based on data output from the counter circuit section;

a combinational circuit section configured to select any one of the frequency divided clock signals output from the frequency divider section based on the selection signal output from the selector circuit section, and output the selected frequency divided clock signal when a predetermined control signal is input from the control circuit section; and a code counter circuit section configured to count the number of clock pulses of the frequency divided clock signal output from the combinational circuit section, and output data indicating the counted value as the waveform data, and wherein the control circuit section terminates outputting the predetermined control signal when the waveform data output from the code counter circuit section indicates the predetermined data.

9. The switching power supply circuit as claimed in claim 5, wherein the waveform generating circuit includes:

a frequency divider section configured to divide a frequency of the clock signal by a frequency dividing ratio based on the signal input from the control circuit section;

a counter circuit section configured to count the number of clock pulses of the frequency divided signal output from the frequency divider section when the predetermined control signal is input from the control circuit section; and a data converter section configured to convert data output from the counter circuit section according to a predetermined method and output the converted data as the waveform data, and wherein the control circuit section terminates outputting the predetermined control signal when the data output from the counter circuit section indicates a predetermined data.

10. The switching power supply circuit as claimed in claim 7, wherein the data converter section converts the data output from the counter circuit section based on a predetermined conversion table.

* * * * *